(12) United States Patent
Nakanishi et al.

(10) Patent No.: US 10,923,049 B2
(45) Date of Patent: Feb. 16, 2021

(54) DISPLAY DEVICE AND SIGNAL PROCESSING METHOD

(71) Applicant: Panasonic Intellectual Property Management Co., Ltd., Osaka (JP)

(72) Inventors: Hirokazu Nakanishi, Osaka (JP); Takashi Higashida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 16/321,850

(22) PCT Filed: Sep. 4, 2017

(86) PCT No.: PCT/JP2017/031702
§ 371 (c)(1),
(2) Date: Jan. 30, 2019

(87) PCT Pub. No.: WO2018/047753
PCT Pub. Date: Mar. 15, 2018

(65) Prior Publication Data
US 2019/0180701 A1   Jun. 13, 2019

(30) Foreign Application Priority Data

Sep. 9, 2016 (JP) .................. 2016-176083
Aug. 25, 2017 (JP) .................. 2017-162603

(51) Int. Cl.
*G09G 3/34* (2006.01)
*G09G 5/10* (2006.01)
(Continued)

(52) U.S. Cl.
CPC ............. *G09G 3/3426* (2013.01); *G09G 3/20* (2013.01); *G09G 5/10* (2013.01); *H04N 5/20* (2013.01);
(Continued)

(58) Field of Classification Search
CPC .......... G09G 3/3426; G09G 3/20; G09G 5/10; G09G 2360/16; G09G 2320/0646;
(Continued)

(56) References Cited

U.S. PATENT DOCUMENTS

2010/0238189 A1   9/2010 Feng
2014/0210847 A1   7/2014 Knibbeler et al.
(Continued)

FOREIGN PATENT DOCUMENTS

JP   2012-516458   7/2012
WO   2010/106872   9/2010
WO   2017/110823   6/2017

OTHER PUBLICATIONS

International Search Report of PCT application No. PCT/JP2017/031702 dated Nov. 14, 2017.
(Continued)

*Primary Examiner* — Abhishek Sarma
(74) *Attorney, Agent, or Firm* — McDermott Will & Emery LLP

(57) ABSTRACT

A display device is a display device having a display that displays an image based on a received image signal. This display device includes: a memory that stores maximum luminance information regarding maximum luminance that the display can display; a determiner that determines whether the image signal is an HDR image signal specified by relative luminance; a first converter that, when the determiner determines that the image signal is the HDR image signal specified by the relative luminance, subjects luminance information obtained from the image signal to nonlinear conversion based on a luminance characteristic of the display; and a second converter that converts the luminance information that has been subjected to the nonlinear conversion by the first converter such that the display
(Continued)

displays an image at increased luminance within a luminance range determined in accordance with the maximum luminance information.

12 Claims, 20 Drawing Sheets

(51) Int. Cl.
*H04N 5/232* (2006.01)
*H04N 5/57* (2006.01)
*H04N 5/58* (2006.01)
*G09G 3/20* (2006.01)
*H04N 5/20* (2006.01)

(52) U.S. Cl.
CPC ........... *H04N 5/23232* (2013.01); *H04N 5/57* (2013.01); *H04N 5/58* (2013.01); *G09G 2320/0646* (2013.01); *G09G 2360/16* (2013.01)

(58) Field of Classification Search
CPC .. H04N 5/57; H04N 5/20; H04N 5/58; H04N 5/23232
See application file for complete search history.

(56) References Cited

U.S. PATENT DOCUMENTS

2016/0150145 A1    5/2016   Van Der Vleuten
2018/0241979 A1    8/2018   Kanda et al.

OTHER PUBLICATIONS

Extended European Search Report dated Aug. 21, 2019 for the related European Patent Application No. 17848693.2.

DISPLAY DEVICE AND SIGNAL PROCESSING METHOD

CROSS-REFERENCE TO RELATED APPLICATIONS

This application is a U.S. national stage application of the PCT International Application No. PCT/JP2017/031702 filed on Sep. 4, 2017, which claims the benefit of foreign priority of Japanese patent applications No. 2017-162603 filed on Aug. 25, 2017 and No. 2016-176083 filed on Sep. 9, 2016, the contents all of which are incorporated herein by reference.

TECHNICAL FIELD

The present disclosure relates to a display device and a signal processing method.

BACKGROUND ART

PTL 1 discloses a display device equipped with a display that displays a high dynamic range (HDR) image. This display device includes a backlight array and a light bulb and controls these backlight array and light bulb based on a received image signal, thereby displaying an HDR image in the display.

CITATION LIST

Patent Literature

PTL 1: Japanese Translation of PCT Publication No. 2012-516458

SUMMARY

The present disclosure provides a display device and a signal processing method that, even if a display does not support a high luminance image such as an HDR image, makes it possible to display an image at appropriate luminance.

A display device according to an aspect of the present disclosure has a display that displays an image based on a received image signal. This display device includes: a memory that stores maximum luminance information regarding maximum luminance that the display can display; a determiner that determines whether the image signal is a high dynamic range (HDR) image signal specified by relative luminance; a first converter that, when the determiner determines that the image signal is the HDR image signal specified by the relative luminance, subjects luminance information obtained from the image signal to nonlinear conversion based on a luminance characteristic of the display; and a second converter that converts the luminance information that has been subjected to the nonlinear conversion by the first converter such that the display displays an image at increased luminance within a luminance range determined in accordance with the maximum luminance information.

A signal processing method according to an aspect of the present disclosure is performed by a display device having a display that displays an image based on a received image signal. This signal processing method includes: determining whether the image signal is a high dynamic range (HDR) image signal specified by relative luminance; when it is determined that the image signal is the HDR image signal specified by the relative luminance, subjecting luminance information obtained from the image signal to nonlinear conversion based on a luminance characteristic of the display; and converting the luminance information that has been subjected to the nonlinear conversion such that the display displays an image at increased luminance within a luminance range determined in accordance with maximum luminance information regarding maximum luminance that the display can display.

The present disclosure provides a display device and a signal processing method that, even if a display does not support a high luminance image such as an HDR image, makes it possible to display an image at appropriate luminance.

DESCRIPTION OF EMBODIMENTS (Motivation for the Present Disclosure)

An HDR image is an image whose luminance range is wider than a luminance range of a standard dynamic range (SDR) image. For the SDR image, an image signal is generated such that maximum luminance of the image is typically set to 100 nits. For the HDR image, in contrast, maximum luminance of the image is expected to be expanded to be in a luminance range of 1000 nits or above.

A display device displays the HDR image based on an HDR image signal received from the outside. Such HDR image signals are classified into HDR image signals specified by absolute luminance and HDR image signals specified by relative luminance. Of these, the HDR image signals specified by the relative luminance are easily applicable to conventional display devices that can display only SDR images, because the luminance of these HDR image signals can be handled as relative values, similar to SDR image signals. For the HDR image signals specified by the relative luminance, compliance standards, such as ARIB STD-B67, have been created, and those compliance standards are expected to be employed widely.

Figure 21:
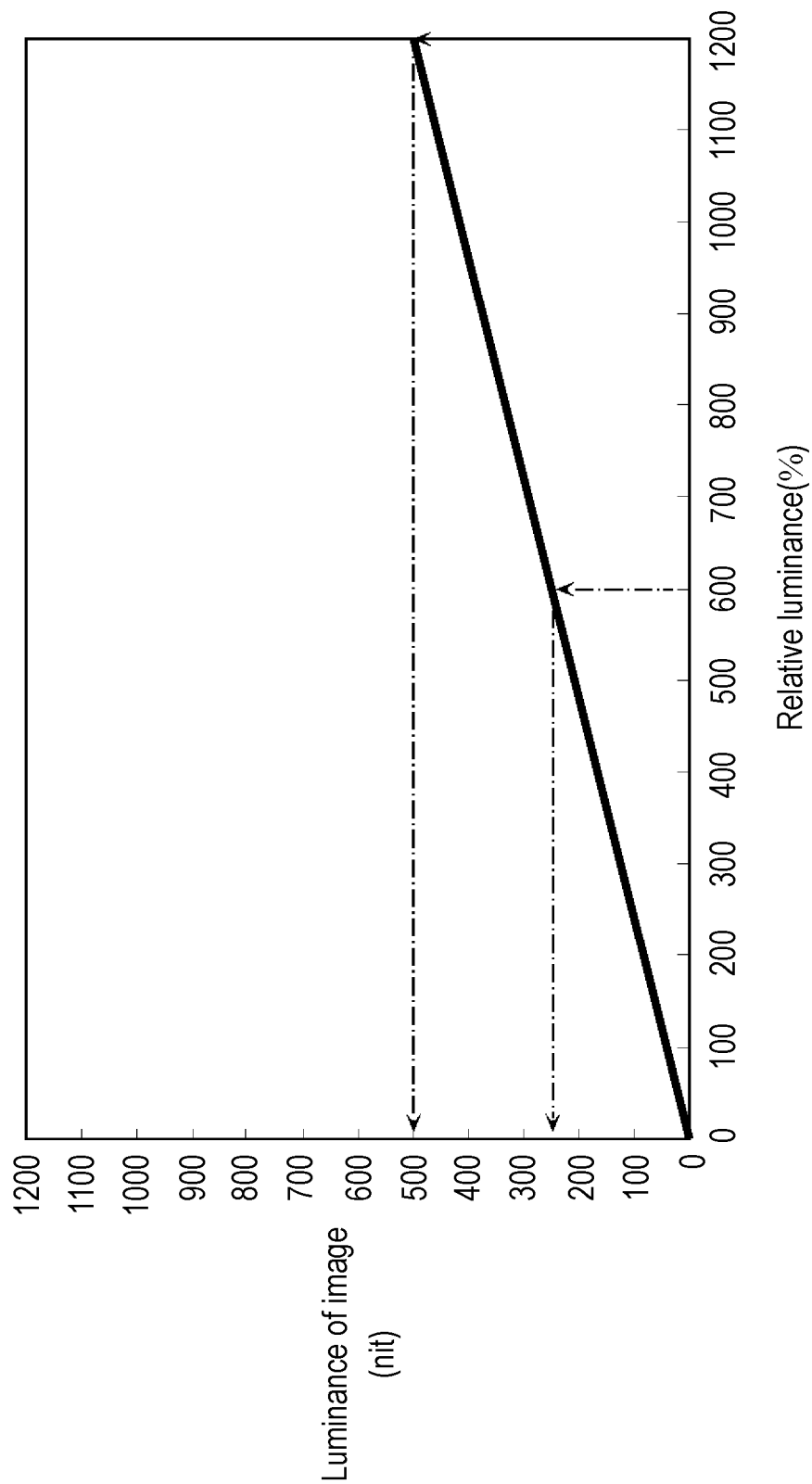
FIG. 21 is an explanatory diagram illustrating an example of a relationship in a conventional display device between an image signal specified by relative luminance and luminance of an image displayed based on the relative luminance.

With reference to FIG. 21, a description will be given below of a disadvantage that may arise when a conventional display device that does not support a luminance range of HDR image signals displays an image based on an HDR image signal specified by the relative luminance.

FIG. 21 is an explanatory diagram illustrating a relationship between an image signal specified by relative luminance and luminance of an image displayed based on a received image signal (an image displayed based on the relative luminance) by a conventional display device. In this example, the conventional display device (display) can display luminance of up to 500 nits.

The relative luminance refers to the relative luminance of light shot to obtain an image signal. The received image signal contains information indicating that this image signal is an HDR image signal specified by the relative luminance. In the example of FIG. 21, for example, the image signal contains information indicating, for example, that this image signal is specified by the relative luminance in a range from 0% to 1200% (equivalent to luminance in a range from 0 nits to 1200 nits).

The conventional display device is configured to linearly expand a SDR image signal. When this conventional display device linearly converts the HDR image signal specified by the relative luminance as illustrated in FIG. 21, a pixel having luminance of 1200% that is equivalent to maximum luminance of the received image signal is displayed at 500 nits, which is the maximum luminance that the display device can display. In addition, a pixel at medium luminance of 600% is displayed at 250 nits.

If a luminance range (0 nits to 500 nits) that the display can display is narrower than a luminance range (0 nits to 1200 nits) of the relative luminance, the conventional display device displays an image with its luminance uniformly lowered over an entire luminance range. More specifically, if the conventional display device that does not support a luminance range of an HDR image displays an image based on an HDR image signal specified by the relative luminance, the displayed image is darkened in a low to middle luminance range.

Therefore, a display device of the present disclosure converts luminance information obtained from an HDR image signal, in accordance with the maximum luminance that the display can display. As a result, even if its display does not support a luminance range of an HDR image, the display device of the present disclosure can display an image whose luminance is adjusted appropriately, especially in a low to middle luminance range.

Hereinafter, a description will be given of some embodiments of the display device and a signal processing method of the present disclosure, with reference to the drawings as appropriate. This description will be centered on specific aspects of conversion of luminance information. In some instances, excessively detailed descriptions will be skipped. For example, a detailed description of known matters and a duplicate description of substantially identical configurations may be skipped. This is to avoid the following description from being unnecessarily redundant and thus to help those skilled in the art to easily understand the description.

Note that the accompanying drawings and the following description are provided for those skilled in the art to fully understand the present disclosure, and are not intended to limit the subject matter as described in the appended claims.

Not all the drawings are illustrated accurately, and some of the drawings are schematic views simplified as appropriate for the purpose of showing the present disclosure in an easily understood manner. Further, in the respective drawings, substantially identical components are denoted by identical reference marks, and descriptions of those components may be omitted or simplified.

First Exemplary Embodiment

A first exemplary embodiment will be described below with reference to FIGS. 1 to 5.

[1-1. Configuration]

Figure 1:
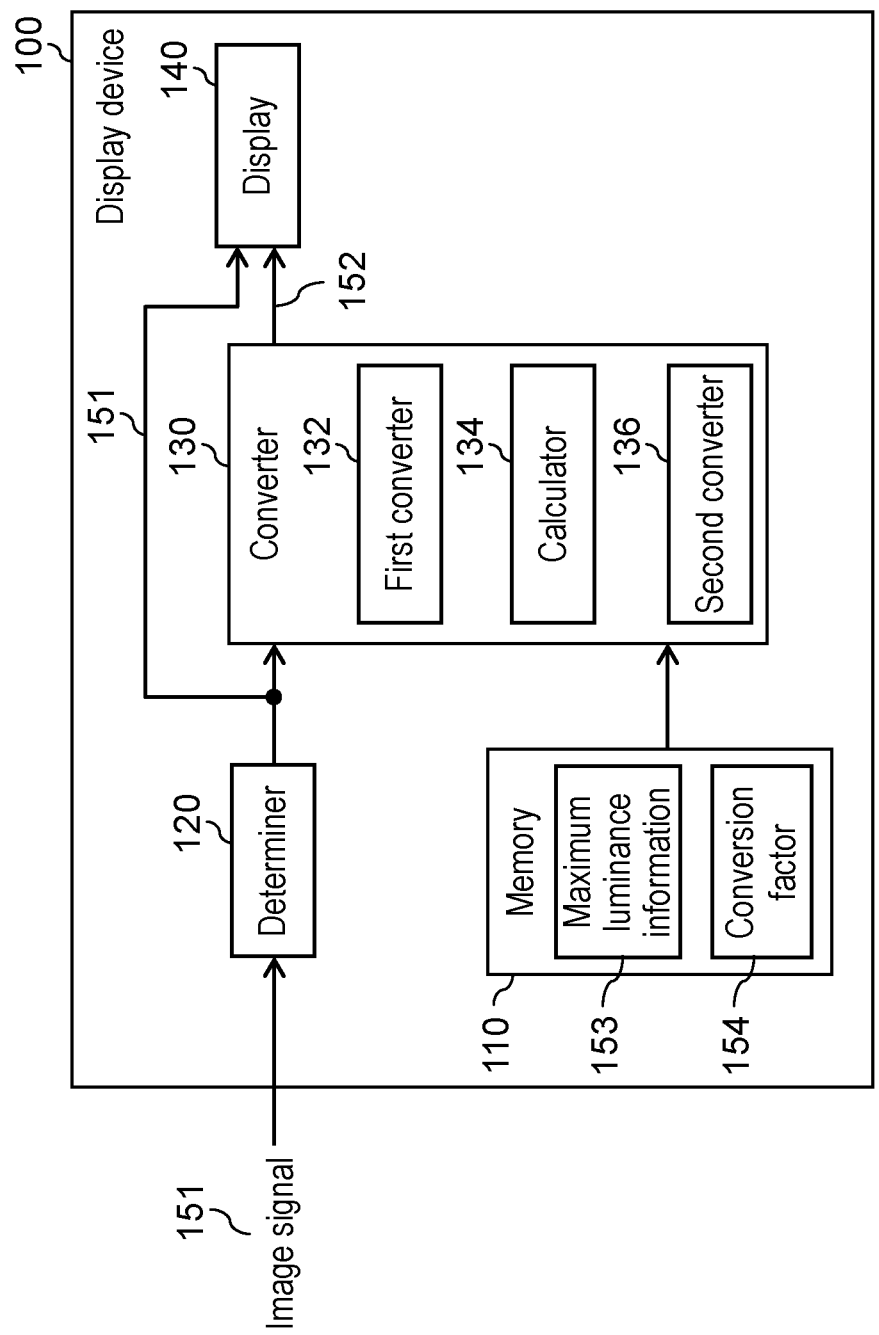
FIG. 1 is a block diagram schematically illustrating an example of a configuration of a display device in a first exemplary embodiment.

FIG. 1 is a block diagram schematically illustrating an example of a configuration of a display device in a first exemplary embodiment.

As illustrated in FIG. 1, display device 100 in the first exemplary embodiment includes memory 110, determiner 120, converter 130, and display 140. Converter 130 includes first converter 132, calculator 134, and second converter 136.

Display device 100 receives image signal 151 via, for example, a medium, such as a Blu-ray (registered trademark) disc, or a broadcast.

Display 140 displays an image based on received image signal 151 or image signal 152. In this exemplary embodiment, maximum luminance that display 140 can display (a maximum value of luminance that display 140 can display) may be 500 nits, for example.

Memory 110 stores maximum luminance information 153 regarding the maximum luminance that display 140 can display. Maximum luminance information 153 in this exemplary embodiment indicates a value equivalent to 500 nits, which is the maximum luminance that display 140 can display. In addition to maximum luminance information 153, memory 110 further stores conversion factor 154.

Conversion factor 154 in this exemplary embodiment may be set to 100%/100 nits. Details of conversion factor 154 will be described later.

Determiner 120 determines a type of received image signal 151. More specifically, determiner 120 determines whether received image signal 151 is an SDR image signal or an HDR image signal. When image signal 151 is the HDR image signal, determiner 120 further determines whether image signal 151 is an HDR image signal specified by absolute luminance or an HDR image signal specified by the relative luminance. For example, determiner 120 determines whether image signal 151 is the HDR image signal specified by the relative luminance, based on header information obtained from received image signal 151. Alternatively, determiner 120 may determine the type of image signal 151, based on information other than header information which is contained in image signal 151.

When determiner 120 determines that image signal 151 is the HDR image signal specified by the relative luminance, converter 130 reads maximum luminance information 153 and conversion factor 154 from memory 110. Further, converter 130 reads a luminance range of image signal 151, for example, from the header information obtained from received image signal 151. Converter 130 generates a conversion curve, based on maximum luminance information 153 read from memory 110 and the luminance range of image signal 151 read from the header information in image signal 151.

Based on the generated conversion curve, converter 130 converts the luminance information obtained from the HDR image signal. Then, converter 130 outputs image signal 152, which is converted luminance information, to display 140. In this case, the luminance information obtained from the HDR image signal may be, for example, a luminance signal (Y) related to YCbCr contained in image signal 151 or a signal related to RGB obtained by converting a signal related to YCbCr.

Converter 130 reads maximum luminance information 153 and conversion factor 154 from memory 110, and reads the luminance range of image signal 151 from the header information contained in image signal 151. Converter 130 converts maximum luminance information 153 read from memory 110 into relative values. After that, first converter 132 subjects the luminance range of image signal 151 and maximum luminance information 153 converted into the relative values to nonlinear conversion (first conversion).

The nonlinear conversion in this exemplary embodiment is, for example, conversion in which opto-electronic transfer function (OETF) conversion conforming to ARIB STD-B67 is reversely made and gamma conversion is further made. In this case, a gamma value in the gamma conversion may be 1/2.2.

Alternatively, the nonlinear conversion may also be conversion other than the above conversions. This nonlinear conversion (first conversion) is nonlinear conversion (re-mapping) based on luminance characteristics of display 140 and made based on a scheme (OETF) of image signal 151 and the luminance characteristics (e.g., gamma value) of display 140.

Calculator 134 in converter 130 determines luminance range R and gain G, based on maximum luminance information 153 and the luminance range of image signal 151. A calculation method used to determine luminance range R and gain G will be described later.

Second converter 136 in converter 130 applies conversion using gain G (second conversion) to the luminance information that has been subjected to the nonlinear conversion by first converter 132 such that display 140 will display an image at increased luminance within luminance range R determined by calculator 134.

In this way, converter 130 generates the conversion curve. The conversion of the luminance information made by second converter 136 will be described later.

Display 140 displays an image based on image signal 152, which is the luminance information output from converter 130. For example, display 140 may be a liquid crystal display panel or an organic electro luminescence (EL) display panel. Display 140 in this exemplary embodiment displays an image in accordance with a gamma property having 2.2 in gamma value.

[1-2. Operation]

[1-2-1. Operation of Display Device 100]

An operation of display device 100 configured above will be described below, with reference to FIG. 2.

Figure 2:
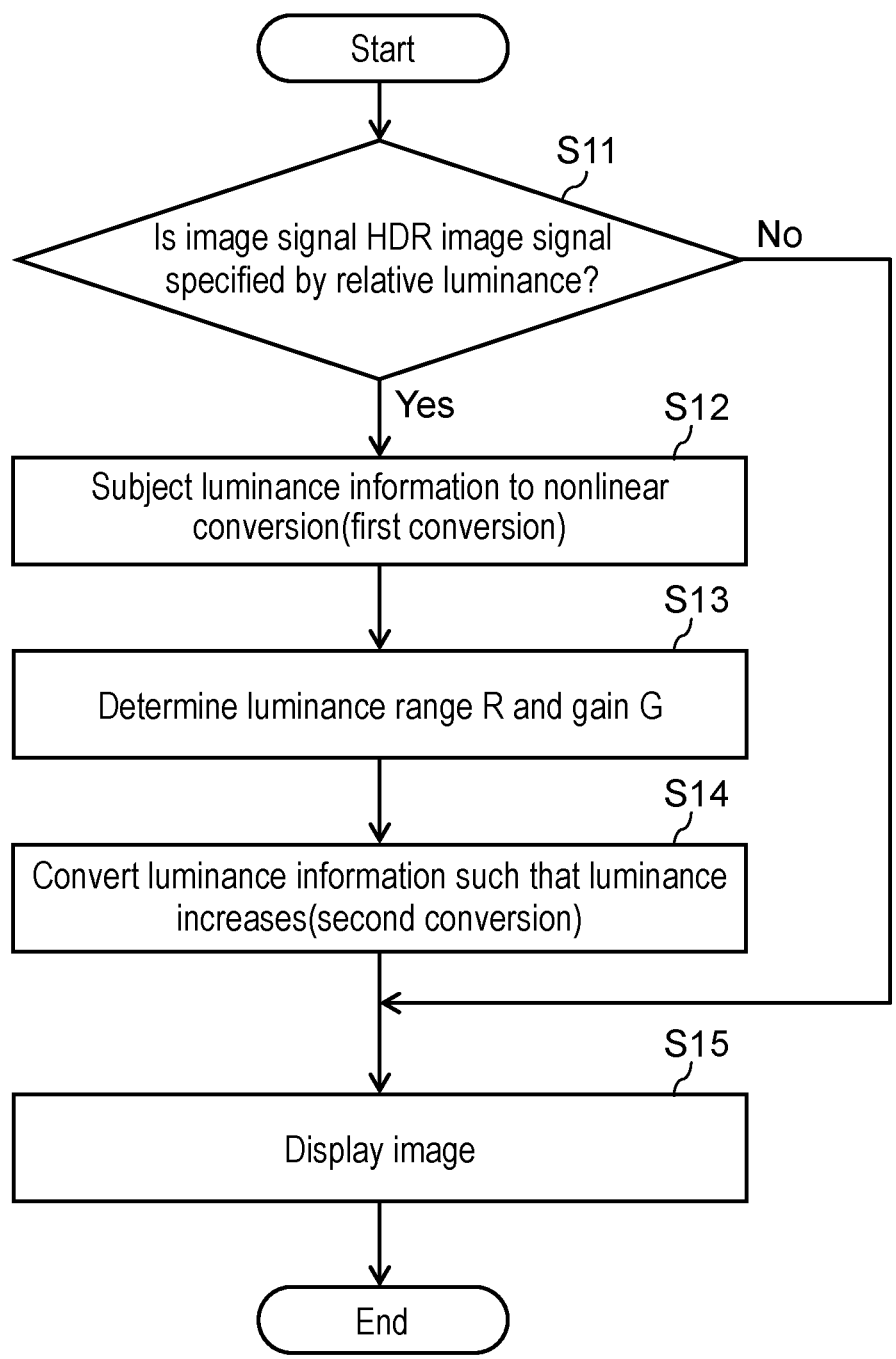
FIG. 2 is a flowchart of an example of an operation of the display device in the first exemplary embodiment.

FIG. 2 is a flowchart of an example of an operation of display device 100 in the first exemplary embodiment.

Determiner 120 determines whether image signal 151 received by display device 100 is an HDR image signal specified by the relative luminance (step S11).

When determiner 120 determines that image signal 151 is the HDR image signal specified by the relative luminance at step S11 (in the case of YES at step S11), converter 130 reads maximum luminance information 153 and conversion factor 154 from memory 110. In addition, converter 130 reads a luminance range of received image signal 151 from header information obtained from image signal 151. Then, converter 130 generates the conversion curve by using read maximum luminance information 153, conversion factor 154, and the luminance range. Each piece of luminance information in the HDR image signal is converted based on this conversion curve, and the converted luminance information is output to display 140.

More specifically, converter 130 converts maximum luminance information 153 read from memory 110 into relative values. Then, first converter 132 subjects the luminance range of an image and maximum luminance information 153 that has been converted into the relative values to the nonlinear conversion (step S12).

Calculator 134 determines luminance range R and gain G based on the luminance range of image signal 151 and maximum luminance information 153 that have been subjected to the nonlinear conversion (first conversion) (step S13). A method of determining luminance range R and gain G will be described later (see FIG. 4).

Second converter 136 uses gain G to convert the luminance information that has been subjected to the nonlinear conversion by first converter 132 such that display 140 will display an image at increased luminance within luminance range R determined by calculator 134. In addition, second converter 136 sets the luminance information that has been subjected to the nonlinear conversion by first converter 132 to a maximum value, within a range in which the luminance is higher than in luminance range R. In this way, converter 130 generates the conversion curve (step S14).

After that, when display device 100 receives the HDR image signal (image signal 151), converter 130 converts this HDR image signal by using the generated conversion curve, and then outputs converted image signal 152 to display 140. More specifically, the luminance information obtained from the received HDR image signal is subjected to the nonlinear conversion (first conversion) and then to the second conversion using gain G by which display 140 will display an image at increased luminance within luminance range R. Then, the resultant luminance information is output to display 140. Display 140 displays an image based on image signal 152, which is the luminance information output from converter 130 (step S15).

When determiner 120 determines that image signal 151 is not the HDR image signal specified by the relative luminance at step S11 (in the case of NO at step S11), display device 100 does not perform an operation of converting image signal 151. More specifically, determiner 120 outputs the luminance information based on received image signal 151 to display 140 or performs another conversion operation and outputs the resultant conversion information to display 140. For example, when display device 100 receives an SDR image signal, display device 100 subjects the SDR image signal to only a signal expansion conversion, and display 140 displays the resultant SDR image.

If display device 100 receives an image signal that display 140 cannot display, display device 100 may announce that it is impossible to display an image based on this image signal.

[1-2-2. Method of Calculating Luminance Range R and Gain G]

A description will be given of a method by which calculator 134 determines luminance range R and gain G, with reference to FIGS. 3 and 4.

Figure 3:
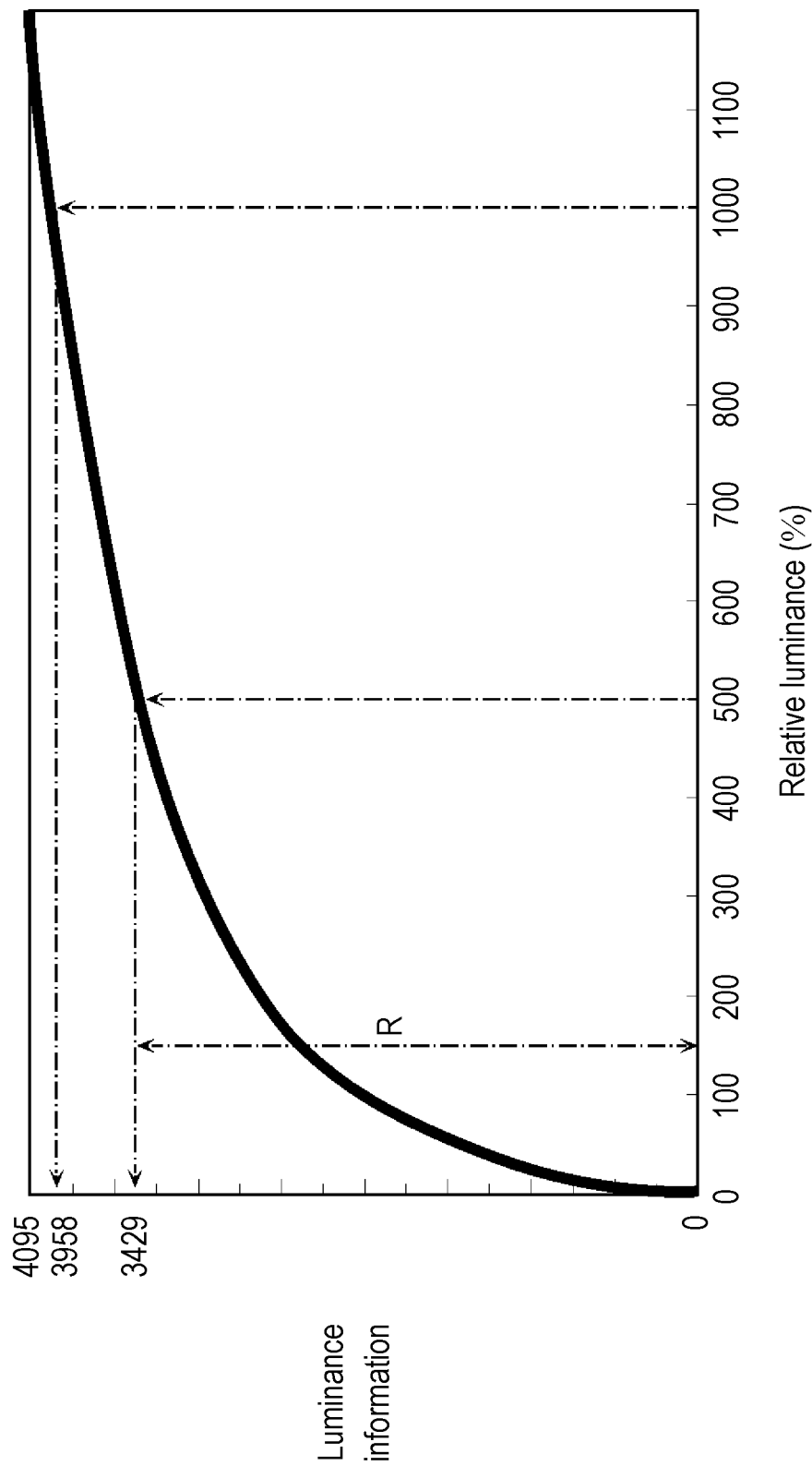
FIG. 3 is an explanatory diagram illustrating an example of a relationship between relative luminance and luminance information obtained by converting the relative luminance.

FIG. 3 is an explanatory diagram illustrating an example of a relationship between the relative luminance and luminance information obtained by converting the relative luminance. FIG. 3 is an explanatory diagram illustrating OETF conversion based on ARIB STD-B67.

In this exemplary embodiment, the header information in the HDR image signal to be received by display device 100 indicates that the image luminance is specified by the relative luminance in the range of 0% to 1200% (equivalent to luminance of 0 nits to 1200 nits). In addition, the HDR image signal to be received by display device 100 is converted into luminance information quantized in the form of 12 bits (digital values) by the OETF conversion conforming to ARIB STD-B67. For example, if an image has the relative luminance of 1000% (equivalent to 1000 nits), the image is entered into display device 100 as luminance information "3958". If an image has the relative luminance of 500% (equivalent to 500 nits), the image is entered into display device 100 as luminance information "3429".

Converter 130 reads maximum luminance information 153 and conversion factor 154 stored in memory 110 from memory 110. Then, converter 130 converts maximum luminance information 153 into the relative luminance by multiplying maximum luminance information 153 (500 nits) by conversion factor 154 (100%/100 nits). Thus, the relative luminance of the maximum luminance that display 140 can display is 500%.

Converter 130 reads the luminance range of image signal 151 from the header information in the received HDR image signal. In this exemplary embodiment, as described above, the header information in the HDR image signal to be received indicates that the image luminance is specified by the relative luminance in the range from 0% to 1200%. As can be seen from FIG. 3, the relative luminance (1200%) is OETF converted into a digital value "4095", and the relative luminance (500%) equivalent to the maximum luminance at which display 140 can display image signal 151 to be received is calculated as a digital value "3429".

In short, calculator 134 uses the relationship (OETF) between the luminance information (digital value) in image signal 151 and the relative luminance to convert the relative luminance represented by maximum luminance information 153 into the luminance information related to the relative luminance. In other words, calculator 134 uses the above relationship (OETF) to convert the relative luminance range (0% (nits) to 500% (nits)) that display 140 supports into luminance range R of the luminance information. For example, display device 100 may store the above relationship (OETF) in advance.

With the above calculation method, calculator 134 sets luminance range R of the luminance information to a "range from 0 to 3429".

Figure 4:
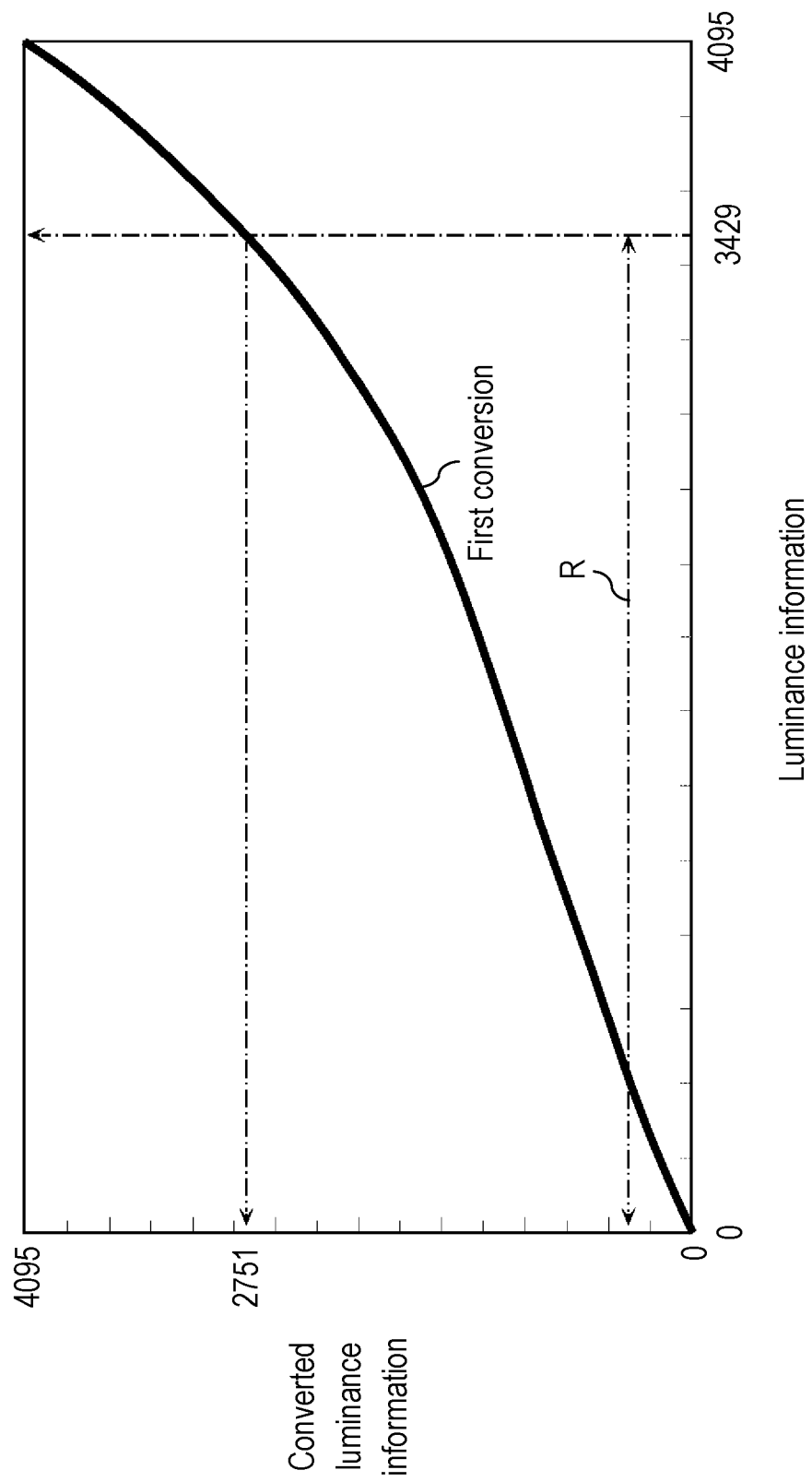
FIG. 4 is an explanatory diagram illustrating an example of first conversion of the luminance information in the first exemplary embodiment.

FIG. 4 is an explanatory diagram illustrating an example of the first conversion of luminance information in the first exemplary embodiment.

In this exemplary embodiment, for example, when a digital value "3429" obtained by OETF converting the relative luminance (500%) corresponding to the maximum luminance of display 140 is subjected to the first conversion, a digital value "2751" is obtained. As described above, calculator 134 calculates gain G from both the digital value "2751", which is obtained by subjecting maximum luminance information 153 of display 140 to the nonlinear conversion, and the digital value "4095", which is the maximum value of the luminance information. More specifically, calculator 134 determines that gain G is "1.4885", from the ratio of the digital value "2751" based on the maximum luminance information of display 140 to the digital value "4095", which is the maximum value of the luminance information. In other words, it is possible to obtain gain G "1.4885" by dividing the digital value "4095", which is the maximum value of the luminance information, by the digital value "2751" based on the maximum luminance information of display 140.

In this way, luminance range R and gain G are determined in accordance with maximum luminance information 153.

[1-2-3. Conversion of Luminance Information]

Details of the second conversion will be described with reference to FIG. 5.

Figure 5:
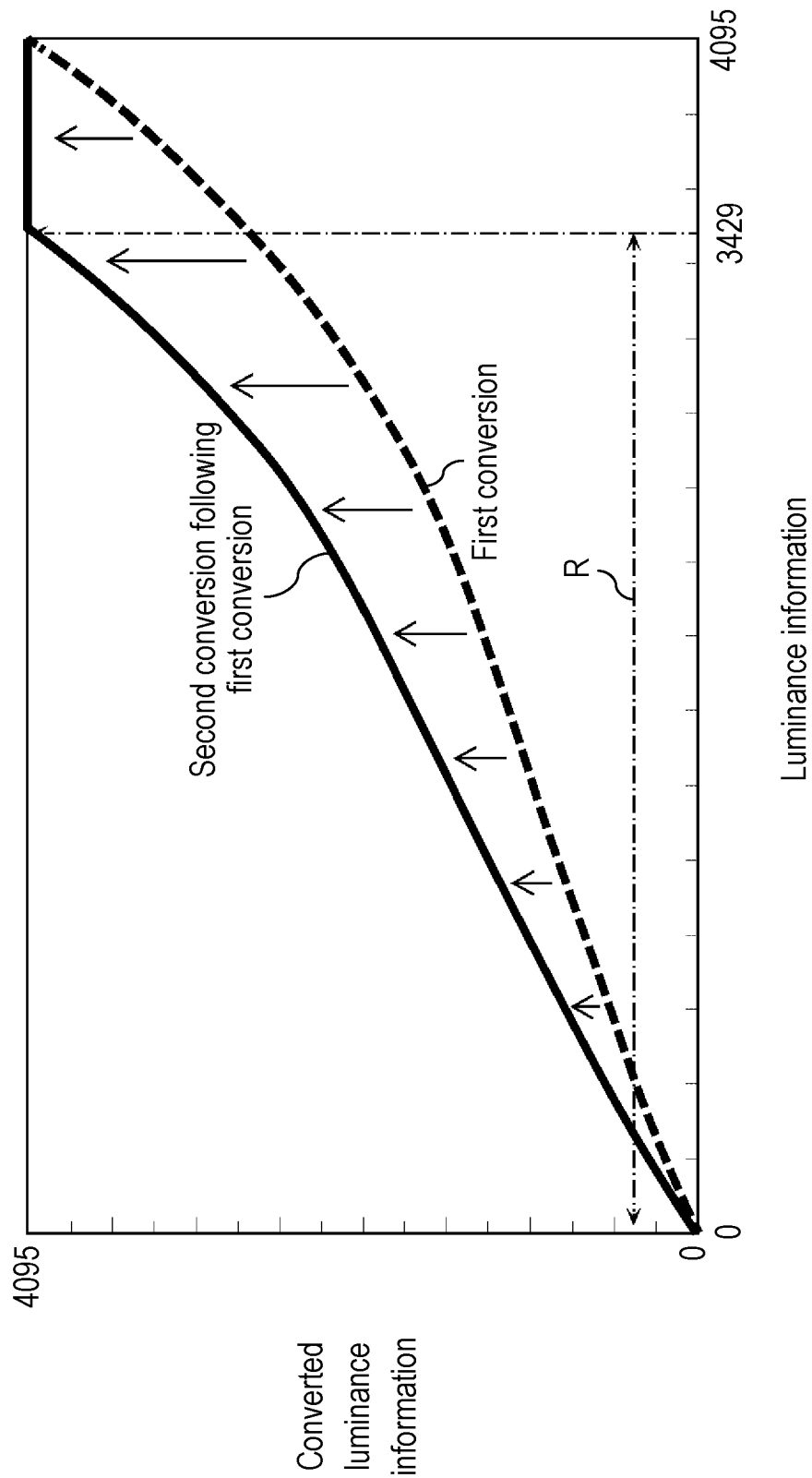
FIG. 5 is an explanatory diagram illustrating an example of second conversion of the luminance information in the first exemplary embodiment.

FIG. 5 is an explanatory diagram illustrating an example of the second conversion of the luminance information in the first exemplary embodiment.

As illustrated in FIG. 5, converter 130 multiplies the luminance information that has been subjected to the nonlinear conversion by gain G, thereby converting the luminance information such that display 140 will display an image at increased luminance within luminance range R. In addition, converter 130 converts the luminance information into a digital value "4095", which is the maximum value of the luminance information, within a range in which luminance is higher than in luminance range R.

Converting the luminance information in this manner provides the conversion curve, by which the luminance information of received image signal 151 is converted into the luminance information to be used for being displayed in display 140.

A description will be given below of a specific example of the conversion of the luminance information in this exemplary embodiment.

An image that has been shot under the condition of the maximum luminance being set to 1200 nits is OETF converted based on ARIB STD-B67 into digital values. Image signal 151 having these digital values is received by display device 100 together with the header information indicating that image signal 151 is an HDR image signal specified by the relative luminance and that the HDR image signal is specified by the relative luminance of 1200%, for example.

From the header information, determiner 120 determines that image signal 151 received by display device 100 is the HDR image signal specified by the relative luminance. Then, determiner 120 outputs information which indicates that received image signal 151 is the HDR image signal specified by the relative luminance to converter 130. Converter 130 receives the information output from determiner 120 and reads maximum luminance information 153 and conversion factor 154 from memory 110.

First converter 132 subjects the maximum luminance information (500%) of display 140 read from memory 110 and the relative luminance range (1200%) of the image signal received by display device 100 to the nonlinear conversion (first conversion). Then, calculator 134 determines luminance range R and gain G. Second converter 136 multiplies luminance range R of the luminance information that has been subjected to the first conversion by gain G (second conversion).

In this way, converter 130 generates the conversion curve by which display 140 will display an image at increased luminance.

For example, a shot image of 500 nits is received by display device 100 as a digital value "3429" under the above setting condition. This digital value "3429" is converted into a digital value "4095" by the conversion curve generated through the first conversion and the second conversion. Based on this digital value "4095", display 140 displays an image at luminance of 500 nits, which is the maximum luminance that display 140 can display.

Thus, even if received image signal 151 is based on the HDR image signal specified by the relative luminance, display device 100 can display image signal 151 that represents light having luminance of 500 nits as an image at luminance of 500 nits.

Herein, the "converting luminance information such that luminance increases" refers to the "converting luminance information such that luminance after the second conversion becomes higher than luminance before the second conversion"; however, some of the luminance may have the same value before and after the second conversion. For example, display device 100 may convert the luminance information such that the minimal value "0" of the luminance information before the second conversion becomes the minimal value "0" of the luminance information after the second conversion. In the second conversion, the luminance information is converted by being multiplied by gain G. Thus, this exemplary embodiment can achieve the second conversion with a relatively simple configuration.

[1-3. Effects and Others]

As described above, a display device according to this exemplary embodiment has a display that displays an image based on a received image signal. This display device includes: a memory that stores maximum luminance information regarding maximum luminance that the display can display; a determiner that determines whether the image signal is an HDR image signal specified by the relative luminance; a first converter that, when the determiner determines that the image signal is the HDR image signal specified by relative luminance, subjects luminance information obtained from the image signal to nonlinear conversion based on a luminance characteristic of the display; and a second converter that converts the luminance information that has been subjected to the nonlinear conversion by the first converter such that the display displays an image at increased luminance within a luminance range determined in accordance with the maximum luminance information.

A signal processing method according to this exemplary embodiment is performed by a display device having a display that displays an image based on a received image signal. The signal processing method includes: determining whether the image signal is an HDR image signal specified by relative luminance; when it is determined that the image signal is the HDR image signal specified by the relative luminance, subjecting luminance information obtained from the image signal to nonlinear conversion based on a luminance characteristic of the display; and converting the luminance information that has been subjected to the nonlinear conversion such that the display displays an image at increased luminance within a luminance range determined in accordance with maximum luminance information regarding maximum luminance that the display can display.

Display device 100 may be an example of the display device. Image signal 151 may be an example of the image signal. Display 140 may be an example of the display. Maximum luminance information 153 may be an example of the maximum luminance information. Memory 110 may be an example of the memory. Determiner 120 may be an example of the determiner. First converter 132 may be an example of the first converter. Luminance range R may be an example of a luminance range determined in accordance with the maximum luminance information. Second converter 136 may be an example of the second converter.

For example, display device 100 described in the first exemplary embodiment has display 140 that displays an image based on received image signal 151. Display device 100 includes memory 110, determiner 120, first converter 132, and second converter 136. Memory 110 stores maximum luminance information 153 regarding maximum luminance that display 140 can display. Determiner 120 determines whether image signal 151 is the HDR image signal specified by the relative luminance. First converter 132, when determiner 120 determines that image signal 151 is the HDR image signal specified by the relative luminance, subjects luminance information obtained from image signal 151 to nonlinear conversion based on luminance characteristics of display 140. Second converter 136 converts the luminance information that has been subjected to the nonlinear conversion by first converter 132 such that display 140 displays an image at increased luminance within luminance range R determined in accordance with maximum luminance information 153.

Display device 100 configured above can display an image at appropriate luminance even if display 140 does not support high luminance image such as an HDR image.

In this exemplary embodiment, the luminance information obtained from image signal 151 may be converted based on the conversion curve generated in advance by converter 130 or may be converted by first converter 132 and second converter 136. With either conversion method, the image is displayed by display 140 in a similar way. However, if the luminance information obtained from image signal 151 is converted based on the conversion curve, it is possible to decrease the amount of calculation required for the conversion, because display device 100 converts the luminance information, based on the already generated conversion curve.

In this exemplary embodiment, as an example, conversion factor 154 is set to 100%/100 nits; however, conversion factor 154 may be set to any value other than 100%/100 nits. If conversion factor 154 is set to be smaller than 100%/100 nits, luminance range R decreases but gain G increases. Display device 100 thereby can display an image at further increased luminance. If conversion factor 154 is set to be larger than 100%/100 nits, luminance range R increases but gain G decreases. Display device 100 thereby can control narrowing of gradations in a high luminance image.

Second Exemplary Embodiment

A second exemplary embodiment will be described below with reference to FIGS. 6, 7, and 8. In the following exemplary embodiments, including the second exemplary embodiment, components that are substantially the same as the components described in the first exemplary embodiment will be given identical reference numerals and will not be described.

[2-1. Configuration]

Figure 6:
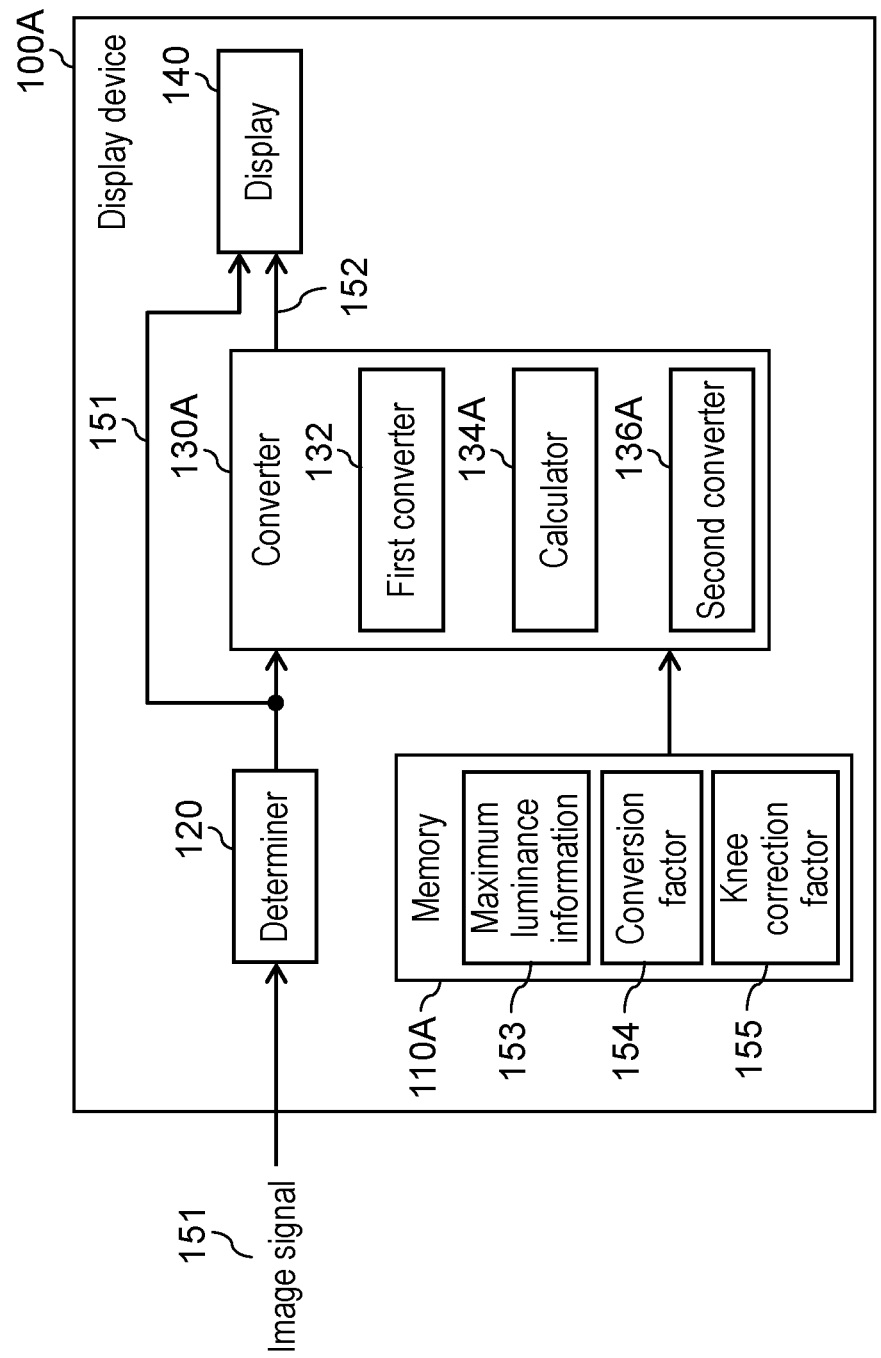
FIG. 6 is a block diagram schematically illustrating an example of a configuration of a display device in a second exemplary embodiment.

FIG. 6 is a block diagram schematically illustrating an example of a configuration of display device 100A in the second exemplary embodiment.

The configuration of display device 100A in the second exemplary embodiment will not be described in detail, because this configuration is substantially the same as the configuration of display device 100 which has been described in the first exemplary embodiment with reference to FIG. 1. However, display device 100A in the second exemplary embodiment differs from display device 100 described in the first exemplary embodiment, because memory 110A stores knee correction factor 155 in addition to maximum luminance information 153 and conversion factor 154. Furthermore, display device 100A in the second exemplary embodiment also differs from display device 100 described in the first exemplary embodiment, in a method by which calculator 134A calculates a luminance range and a conversion method performed by second converter 136A. More specifically, second converter 136A in the second exemplary embodiment makes a knee correction to luminance information within a high luminance range in order to suppress luminance of a high luminance image from being saturated. Details of the knee correction will be described later.

[2-2. Operation]

[2-2-1. Operation of Display Device 100A]

A description will be given below of an operation of display device 100A configured above in the second exemplary embodiment, with reference to FIG. 7.

Figure 7:
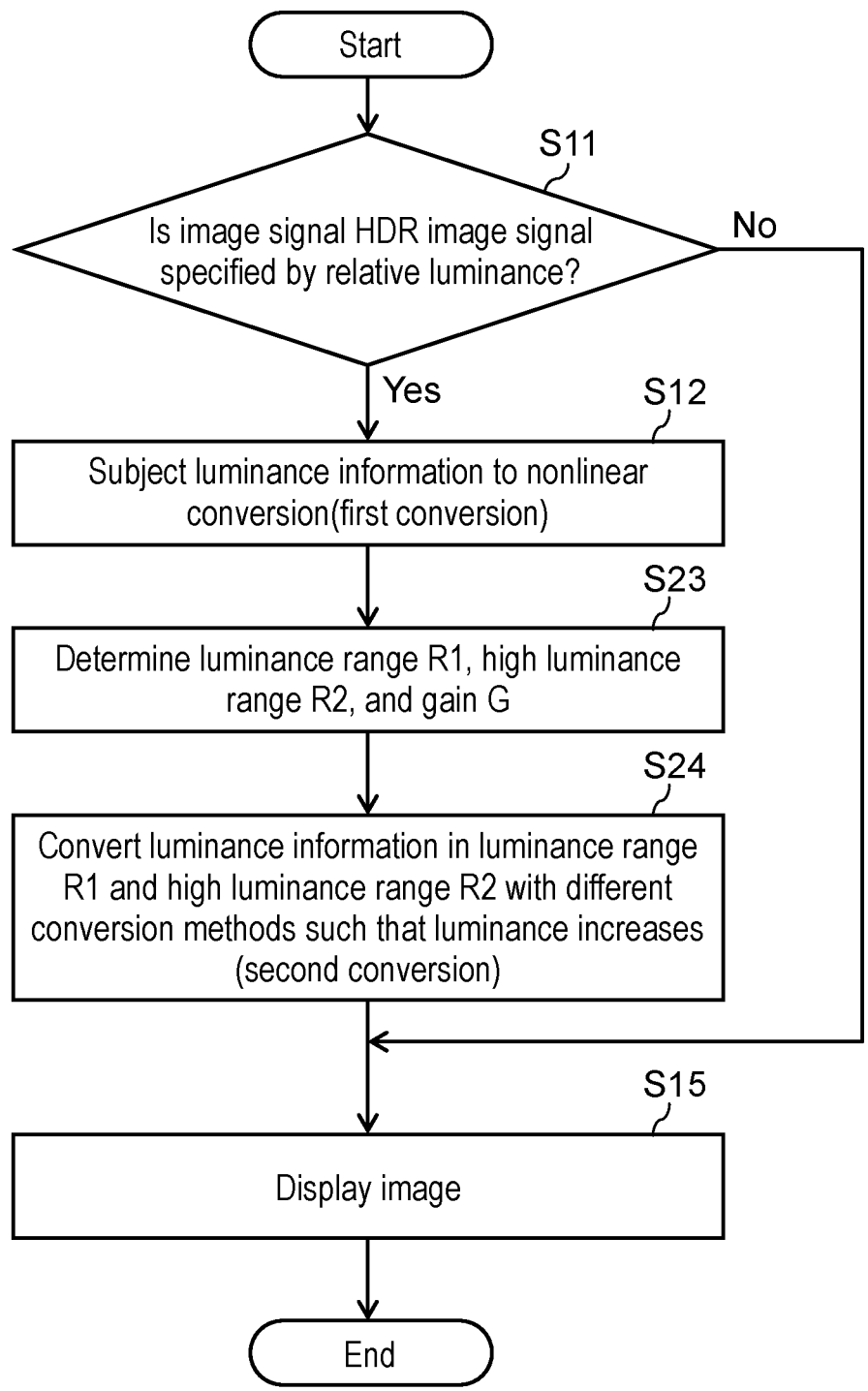
FIG. 7 is a flowchart of an example of an operation of the display device in the second exemplary embodiment.

FIG. 7 is a flowchart of an example of an operation of display device 100A in the second exemplary embodiment. In FIG. 7, operations that are substantially the same as the operations at the steps in the flowchart of FIG. 2 are given identical step numbers and will not be described.

The flowchart of FIG. 7 has step S23 and step S24, instead of step S13 and step S14 illustrated in the flowchart of FIG. 2.

In the case of YES at step S11, converter 130A in the second exemplary embodiment reads knee correction factor 155 from memory 110A in addition to maximum luminance information 153 and conversion factor 154. Furthermore, converter 130A reads a luminance range of received image signal 151 from header information obtained from image signal 151 and generates a conversion curve.

Calculator 134A in the second exemplary embodiment determines luminance range R1, high luminance range R2, and gain G in accordance with maximum luminance information 153 and the luminance range of image signal 151 read from the header information in image signal 151 (step S23), details of which will be described later.

After step S23, second converter 136A in the second exemplary embodiment converts the luminance information that has been subjected to the nonlinear conversion by first converter 132 such that display 140 displays an image at increased luminance within luminance range R1 and within high luminance range R2 determined by calculator 134A (step S24). In which case, different conversion methods are used for luminance range R1 and high luminance range R2.

[2-2-2. Knee Correction]

The knee correction made by second converter 136A will be described with reference to FIG. 8.

Figure 8:
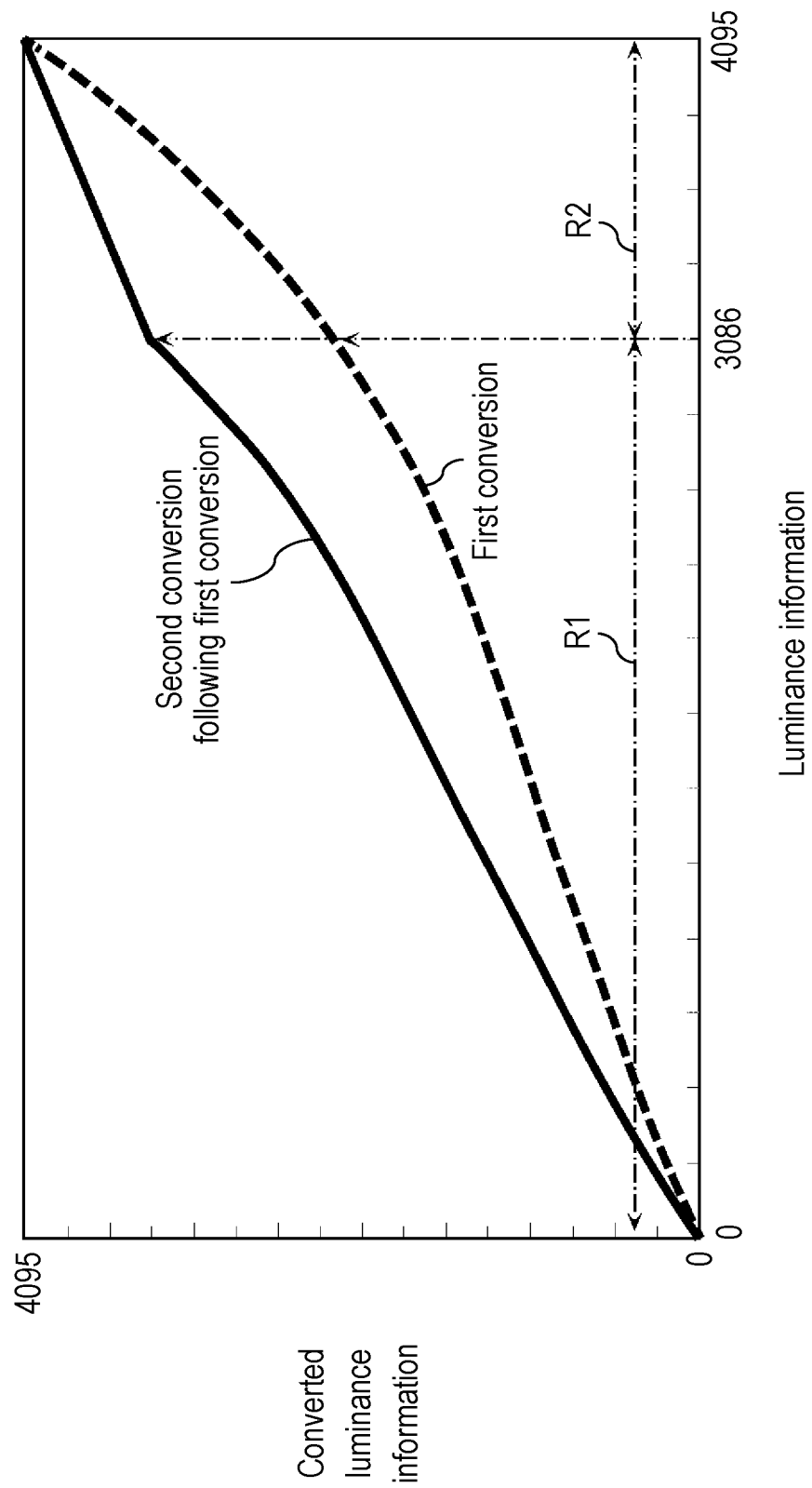
FIG. 8 is an explanatory diagram illustrating an example of second conversion of the luminance information in the second exemplary embodiment.

FIG. 8 is an explanatory diagram illustrating an example of second conversion of the luminance information in the second exemplary embodiment.

Converter 130A in the second exemplary embodiment reads knee correction factor 155 stored in memory 110A. Knee correction factor 155 in this exemplary embodiment may be set to 90%, for example. Calculator 134A in the second exemplary embodiment determines luminance range R1 by multiplying luminance range R (range from 0 to 3429) described in the first exemplary embodiment by knee correction factor 155. For example, new luminance range R1 may be in "the range from 0 to 3086", as illustrated in FIG. 8.

In this exemplary embodiment, luminance range R1 is determined by correcting luminance range R specified by maximum luminance information 153 with knee correction factor 155. In other words, luminance range R1 is determined by maximum luminance information 153 corrected using knee correction factor 155. Calculator 134A in the second exemplary embodiment may set high luminance range R2, which is a range in which luminance is higher than in luminance range R1, to "the range from 3087 to 4095", for example.

Second converter 136A in the second exemplary embodiment multiplies the luminance information that has been subjected to the first conversion by gain G, similar to the first exemplary embodiment, thereby converting the luminance information such that display 140 will display an image at increased luminance within luminance range R1. Moreover, second converter 136A also converts the luminance information such that the luminance information before the first conversion and the luminance information after the second conversion have a linear relationship and display 140 will display an image at increased luminance, within high luminance range R2.

In this case, second converter 136A may convert the luminance information such that the maximum value "4095" of the luminance information before the second conversion becomes the maximum value "4095" of the luminance information after the second conversion. Furthermore, second converter 136A may convert the luminance information within the luminance range from, for example, the maximum value "3086" of luminance range R1 to the maximum value "4095" of high luminance range R2, such that the luminance information before the first conversion and the luminance information after the second conversion have a linear relationship.

In this way, second converter 136A in the second exemplary embodiment makes the knee correction to the luminance information in the high luminance range.

[2-3. Effects and Others]

In a display device in this exemplary embodiment, as described above, a second converter may convert luminance information that has been subjected to nonlinear conversion by a first converter such that a display will display an image at increased luminance within a luminance range and within a high luminance range. Luminance is higher in the high luminance range than in the luminance range. Different conversion methods are used for the luminance range and the high luminance range.

Further, the second converter may convert the luminance information that has been subjected to the nonlinear conversion by the first converter, by multiplying the luminance information in the luminance range by a gain more than 1 and such that the luminance information before the nonlinear conversion and the luminance information after the nonlinear conversion have a linear relationship within the high luminance range.

Herein, display device 100A may be an example of the display device. Memory 110A may be an example of the memory. Second converter 136A may be an example of the second converter. Luminance range R1 may be an example of the luminance range. High luminance range R2 may be an example of the high luminance range. The conversion method using the conversion curve illustrated in FIG. 8 may be an example of the different conversion methods for the luminance range and the high luminance range.

For example, in display device 100A described in the second exemplary embodiment, second converter 136A converts the luminance information that has been subjected to the nonlinear conversion by first converter 132 such that display 140 will display an image at increased luminance within luminance range R1 and within high luminance range R2. Luminance is higher in high luminance range R2 than in luminance range R1. Different conversion methods are used for luminance range R1 and high luminance range R2.

The second conversion in the first exemplary embodiment is made such that the luminance information is converted to "4095" within a range in which luminance is higher than in luminance range R. Therefore, the luminance in a high luminance image may be saturated. However, second converter 136A in this exemplary embodiment makes the knee correction to the luminance information within high luminance range R2. Display device 100A thereby can suppress the luminance of the high luminance image from being saturated.

[2-4. Modification of Second Exemplary Embodiment]

In some instances, a user who views an image wishes to manually adjust a knee correction factor in order to make luminance of an image satisfy his/her preferences. For this reason, display device 100A in a modification of the second exemplary embodiment may make the knee correction in accordance with information received from the user. In this case, the knee correction may be made at the following steps.

The user uses an input device (not illustrated), such as a remote control, to enter information indicating the knee correction factor in display device 100A. In this case, for example, the user may enter the knee correction factor while viewing a menu screen displayed in display 140. The method by which the user enters the knee correction factor may be a method of entering a value of the knee correction factor with the remote control or a method of selecting one from a plurality of choices as the knee correction factor.

When the user enters the knee correction factor in display device 100A, the knee correction factor is transferred to converter 130A. Calculator 134A determines new luminance range R1 by multiplying luminance range R by the knee correction factor entered by the user. In short, luminance range R1 is determined from maximum luminance information corrected using the information entered by the user. Furthermore, calculator 134A determines high luminance range R2, which is a range in which luminance is higher than in luminance range R1.

In the display device in this modification, as described above, a luminance range may be a luminance range determined from maximum luminance information corrected using the information entered by the user.

In display device 100A in this modification, for example, luminance range R1 may be determined from the maximum luminance information corrected using the information (knee correction factor) entered by the user.

Display device 100A configured above and described in this modification can suppress luminance of high luminance image from being saturated and can display an image at luminance according to user's preferences.

Third Exemplary Embodiment

A third exemplary embodiment will be described below with reference to FIGS. 9, 10, and 11.

[3-1. Configuration]

Figure 9:
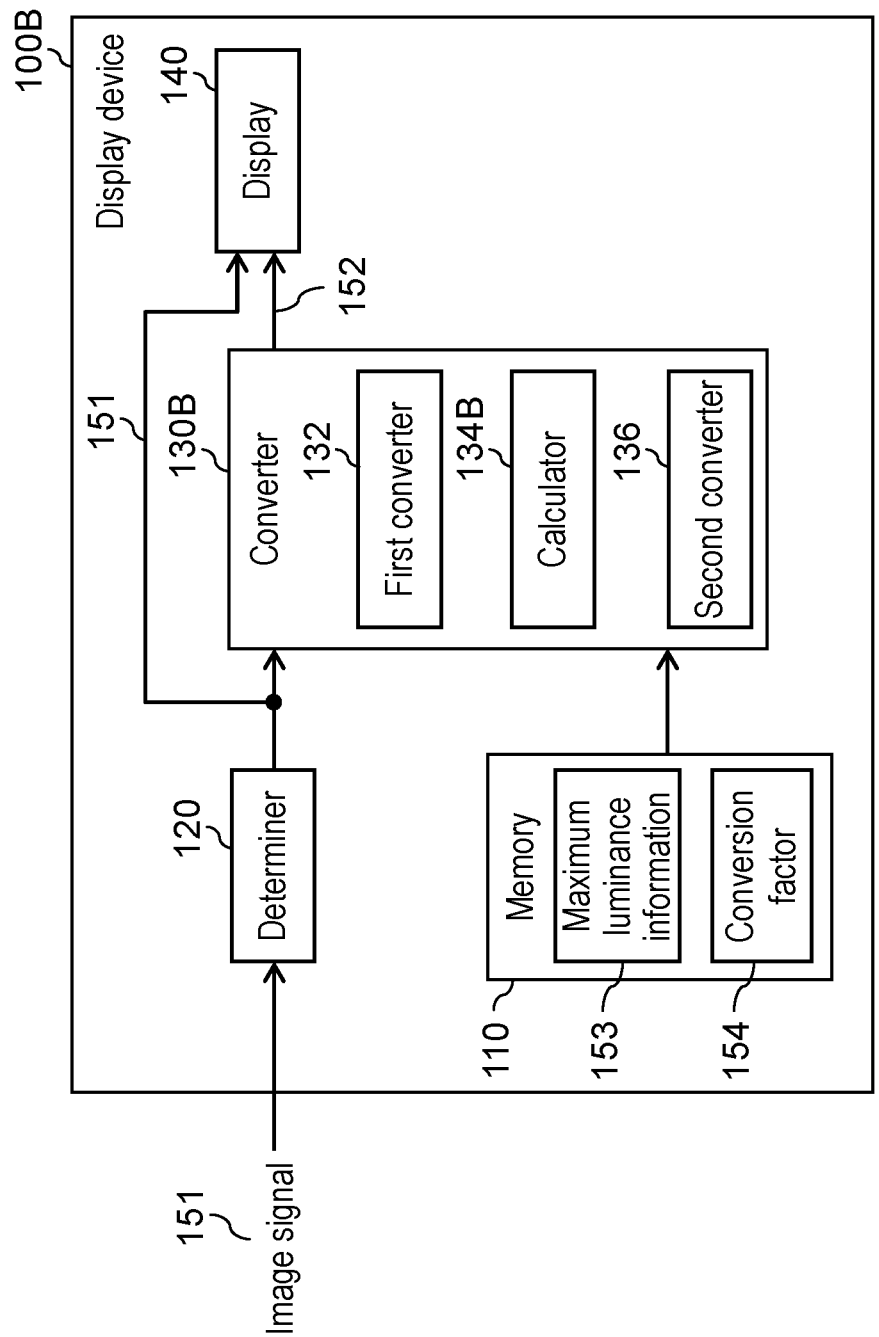
FIG. 9 is a block diagram schematically illustrating an example of a configuration of a display device in a third exemplary embodiment.

FIG. 9 is a block diagram schematically illustrating an example of a configuration of display device 100B in the third exemplary embodiment.

The configuration of display device 100B in the third exemplary embodiment is substantially the same as the configuration of display device 100 described in the first exemplary embodiment with reference to FIG. 1 and thus will not be described in detail. However, converter 130B included in display device 100B in the third exemplary embodiment differs from converter 130 described in the first exemplary embodiment, because converter 130B calculates average luminance of luminance information obtained from received image signal 151. To calculate the average luminance, for example, converter 130B may calculate an average of luminance values of a plurality of pixels for every frame making up an image. The luminance used for the calculation may be luminance information contained in image signal 151 or converted luminance information, such as luminance information that has been subjected to first conversion.

Luminance range R in this exemplary embodiment is determined from maximum luminance information 153 that has been corrected using the average luminance obtained from image signal 151. The correction using the average luminance will be described later

[3-2. Operation]

[3-2-1. Operation of Display Device 100B]

A description will be given below of an operation of display device 100B configured above in the third exemplary embodiment, with reference to FIG. 10.

Figure 10:
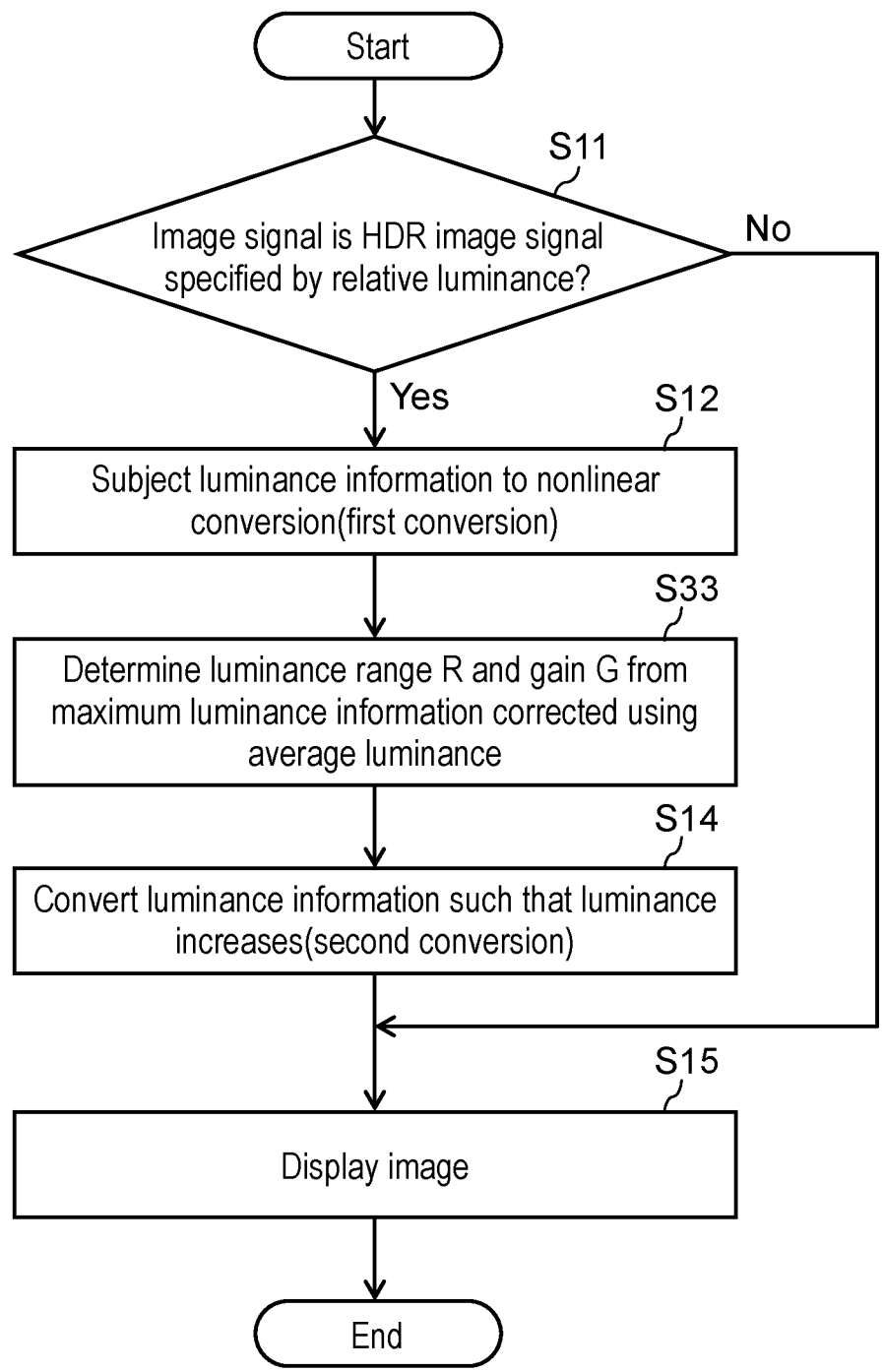
FIG. 10 is a flowchart of an example of an operation of the display device in the third exemplary embodiment.

FIG. 10 is a flowchart of an example of the operation of display device 100B in the third exemplary embodiment. In FIG. 10, operations that are substantially the same as the operations at the steps in the flowchart of FIG. 2 are given identical step numbers and will not be described.

The flowchart of FIG. 10 has step S33, instead of step S13 illustrated in the flowchart of FIG. 2.

In the case of YES at step S11, calculator 134B in the third exemplary embodiment determines luminance range R and gain G from maximum luminance information 153 that has been corrected using the average luminance obtained from image signal 151 (step S33).

[3-2-2. Correction Using Average Luminance]

A description will be given of the conversion of the luminance information in this exemplary embodiment, with reference to FIG. 11.

Figure 11:
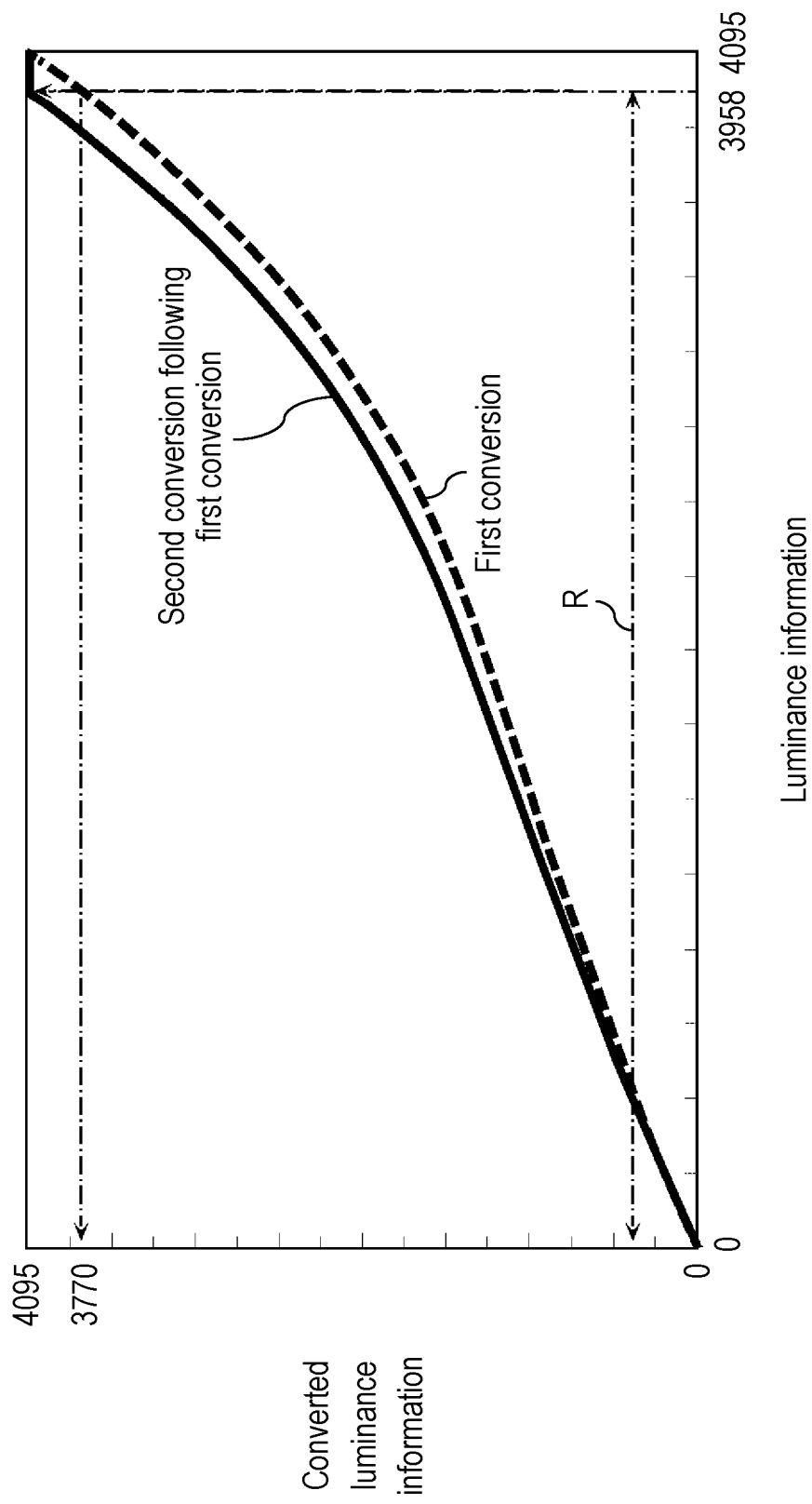
FIG. 11 is an explanatory diagram illustrating an example of second conversion of the luminance information in the third exemplary embodiment.

FIG. 11 is an explanatory diagram illustrating an example of second conversion of luminance information in the third exemplary embodiment.

Converter 130B in the third exemplary embodiment converts conversion factor 154 read from memory 110, in accordance with the calculated average luminance. More specifically, for example, if the average luminance is 25% or above when the maximum luminance is set to 100%, converter 130B converts conversion factor 154 of 100%/100 nits into a conversion factor of 200%/100 nits. Converter 130B corrects maximum luminance information 153 by multiplying maximum luminance information 153 (500 nits) by the converted conversion factor (200%/100 nits). Therefore, corrected maximum luminance information 153 becomes 1000%.

Then, calculator 134B uses corrected maximum luminance information 153 as the relative luminance and calculates a digital value "3958" by OETF converting the relative luminance (1000%) as illustrated in FIG. 3. With the above calculation method, calculator 134B in the third exemplary embodiment sets luminance range R of the luminance information to "the range from 0 to 3958".

In addition, calculator 134B sets gain G to "1.0862" by dividing a digital value "4095", which is the maximum value of the luminance information, by a digital value "3770" that is calculated by subjecting the digital value "3958" to the first conversion.

In short, if the average luminance is higher than a preset threshold (e.g., 25% when the maximum luminance is set to 100%), converter 130B increases conversion factor 154, thereby increasing maximum luminance information 153. As a result, luminance range R increases (the maximum value in luminance range R increases) but gain G decreases. This means that converter 130B sets the maximum value in luminance range R to be a higher value as the average luminance has a higher value.

[3-3. Effects and Others]

In a display device in this exemplary embodiment, as described above, a second converter may set the maximum value in a luminance range to be a higher value as average luminance obtained from an image signal has a higher value.

Herein, display device 100B may be an example of the display device. Second converter 136 may be an example of the second converter.

In display device 100B described in the third exemplary embodiment, for example, luminance range R is determined from maximum luminance information 153 that has been corrected using average luminance obtained from image signal 151.

In the third exemplary embodiment, when the average luminance of received image signal 151 is high, converter 130B converts conversion factor 154. Then, calculator 134B corrects maximum luminance information 153 by using converted conversion factor 154. In this case, maximum luminance information 153 is corrected so as to have a large value. Therefore, luminance range R determined by calculator 134B increases but gain G decreases. In this way, as illustrated in FIG. 11, display device 100B can control narrowing of gradations in a high luminance image.

If information indicating the average luminance is contained in header information obtained from image signal 151, converter 130B does not necessarily have to calculate the average luminance. In this case, calculator 134B may determine luminance range R and gain G from maximum luminance information 153 that has been corrected using the average luminance indicated by the header information obtained from image signal 151.

Fourth Exemplary Embodiment

A fourth exemplary embodiment will be described below with reference to FIGS. 12 to 16. In this exemplary embodiment, a modification of the second exemplary embodiment will be described.

[4-1. Configuration]

Figure 12:
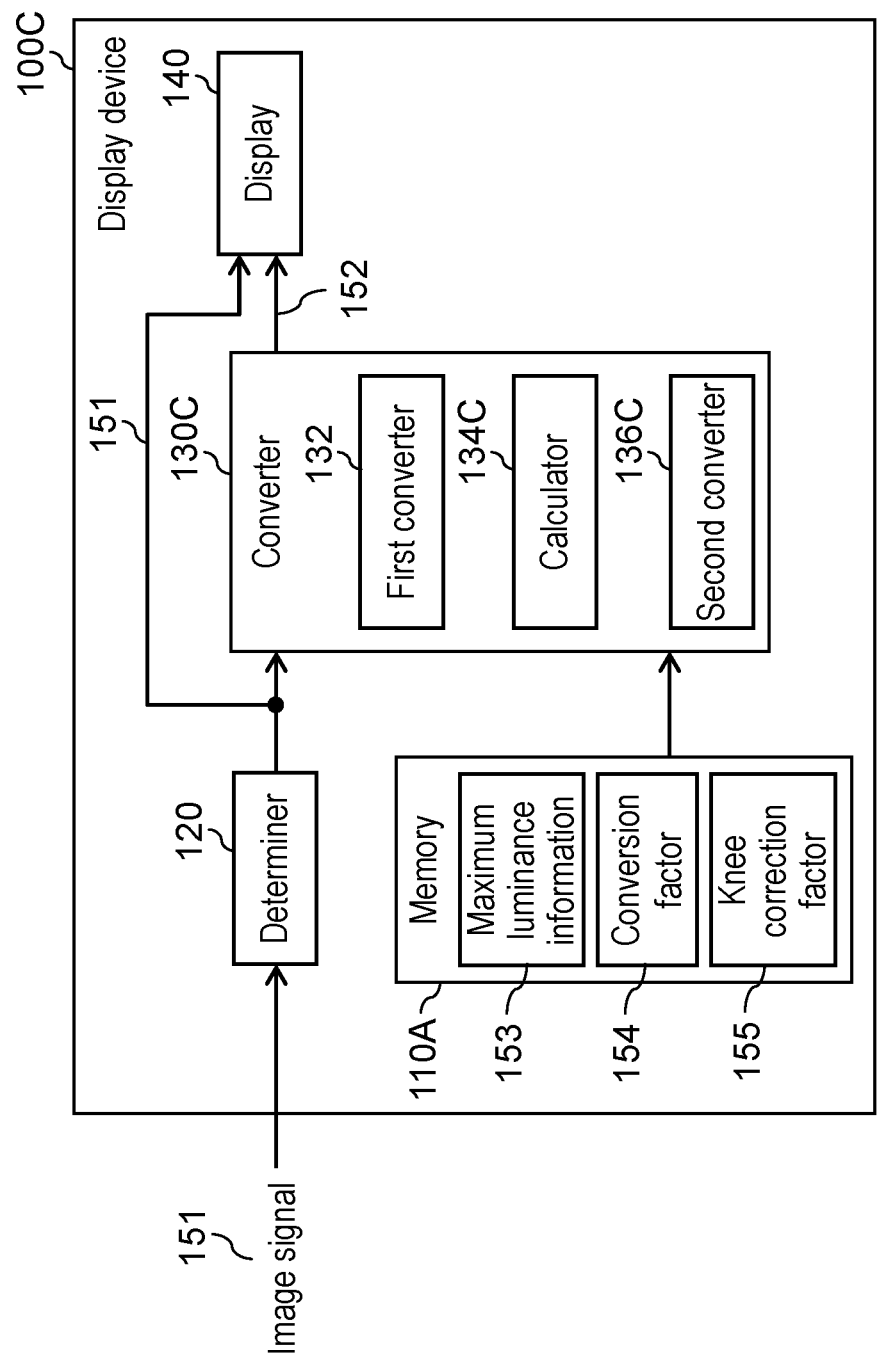
FIG. 12 is a block diagram schematically illustrating an example of a configuration of a display device in a fourth exemplary embodiment.

FIG. 12 is a block diagram schematically illustrating an example of a configuration of display device 100C in the fourth exemplary embodiment.

The configuration of display device 100C in the fourth exemplary embodiment is substantially the same as the configuration of display device 100A described in the second exemplary embodiment with reference to FIG. 6 and thus will not be described in detail. In display device 100C in the fourth exemplary embodiment, however, a method by which calculator 134C calculates a luminance range differs from the method by which calculator 134A calculates the luminance range in the second exemplary embodiment. More specifically, calculator 134C varies a knee correction factor in accordance with maximum luminance or a white area of an image.

[4-2. Operation]

[4-2-1. Operation of Display Device 100C]

A description will be given below of an operation of display device 100C configured above in the fourth exemplary embodiment, with reference to FIG. 13.

Figure 13:
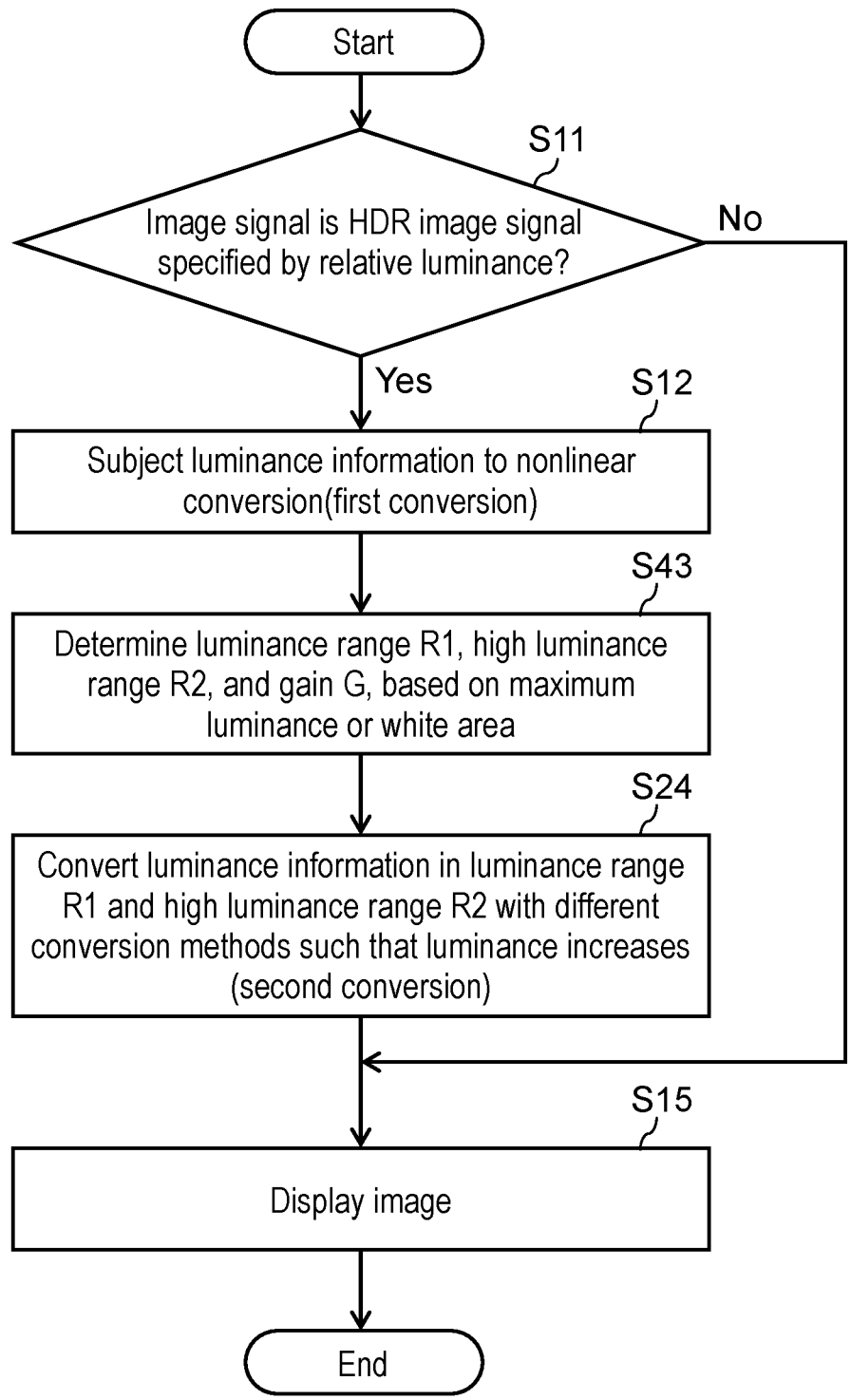
FIG. 13 is a flowchart of an example of an operation of the display device in the fourth exemplary embodiment.

FIG. 13 is a flowchart of an example of the operation of display device 100C in the fourth exemplary embodiment. In FIG. 13, operations that are substantially the same as the operations at the steps in the flowchart of FIG. 7 are given identical step numbers and will not be described.

The flowchart of FIG. 13 has step S43, instead of step S23 illustrated in the flowchart of FIG. 7.

In the case of YES at step S11, converter 130C in the fourth exemplary embodiment determines a knee point in accordance with maximum luminance or a white area, details of which will be described later. For example, converter 130C determines the knee correction factor that has been described in the second exemplary embodiment. Then, calculator 134C in converter 130C uses the determined knee correction factor to determine luminance range R1, high luminance range R2, and gain G in a manner similar to the manner in the second exemplary embodiment (step S43).

[4-2-2. Determination of Knee Point]

A method of determining the knee point will be described with reference to FIGS. 14 to 16.

First, converter 130C determines maximum luminance or a white area of image signal 151. For example, converter 130C makes this determination for each frame. The image for which the maximum luminance or the white area is to be determined may be an image represented by image signal 151 or an image that has been subjected to the first conversion.

In this case, the maximum luminance is the maximum value of luminance to be actually used in image signal 151.

Figure 14:
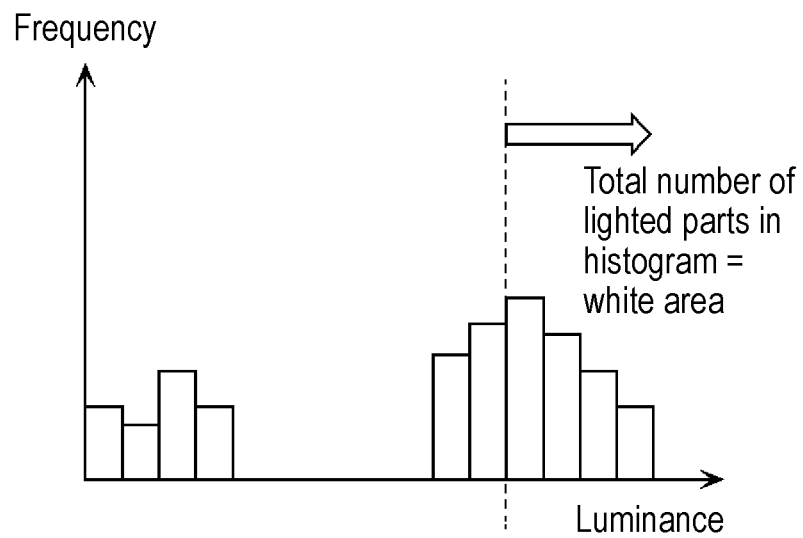
FIG. 14 is an explanatory diagram illustrating a method of detecting a white area in the fourth exemplary embodiment.

FIG. 14 is an explanatory diagram illustrating a method of detecting a white area in the fourth exemplary embodiment. In a luminance histogram of image signal 151, for example, as illustrated in FIG. 14, the white area is calculated by sequentially summing the frequencies of luminance values that are higher than a preset luminance value.

Then, converter 130C determines the knee point in accordance with the maximum luminance or the white area.

Figure 15:
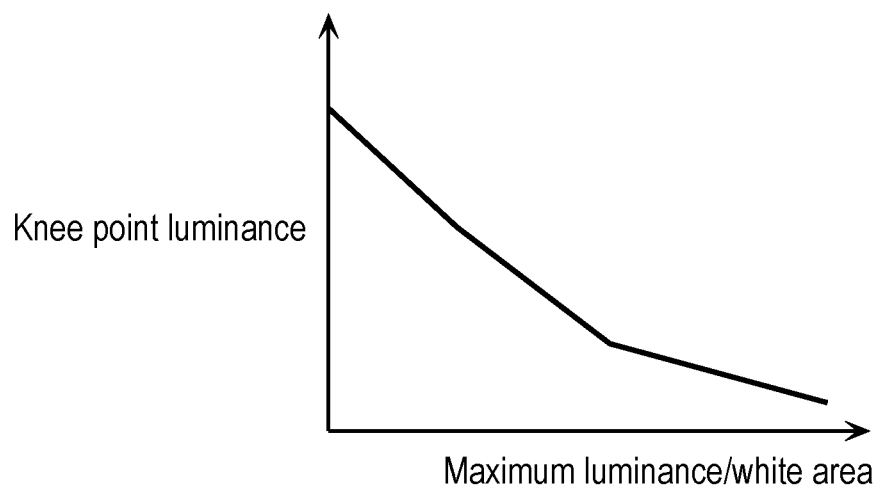
FIG. 15 is a schematic diagram illustrating an example of a relationship between maximum luminance or the white area and a knee point in the fourth exemplary embodiment.

FIG. 15 illustrates a relationship between the maximum luminance or the white area and the knee point. In the fourth exemplary embodiment, as the maximum luminance increases or as the white area increases, the knee point decreases, for example, as illustrated in FIG. 15. For example, converter 130C decreases the knee correction factor as the maximum luminance increases or as the white area increases.

It should be noted that the relationship of FIG. 15 is an example and is not intended to limit this exemplary embodiment at all. For example, the knee point may linearly decrease with an increase in the maximum luminance or with an increase in the white area.

Figure 16:
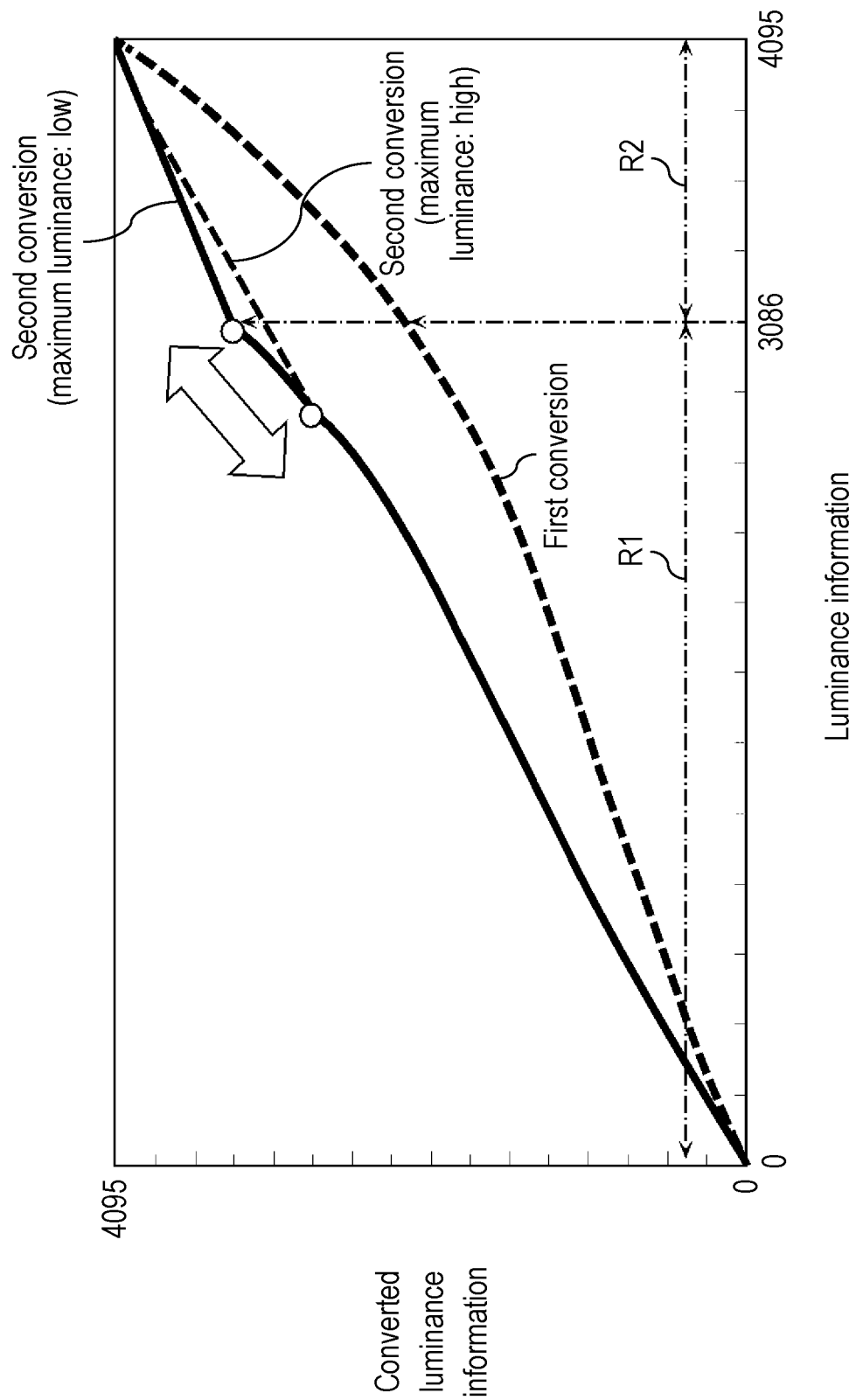
FIG. 16 is an explanatory diagram illustrating an example of second conversion of luminance information in the fourth exemplary embodiment.

FIG. 16 is an explanatory diagram illustrating an example of second conversion of the luminance information in the fourth exemplary embodiment. With the above configuration, display device 100C in the fourth exemplary embodiment changes conversion characteristics in accordance with the maximum luminance or the white area, as illustrated in FIG. 16. In this case, the knee point refers to the border point between luminance range R1 and high luminance range R2, in other words, the maximum value in luminance range R1.

[4-3. Effects and Others]

In a display device in this exemplary embodiment, as described above, a second converter may set the maximum value in a luminance range to a lower value as maximum luminance used in an image signal has a larger value.

Alternatively, in the display device in this exemplary embodiment, the second converter may set the maximum value in the luminance range to a lower value as a white area in the image signal has a larger value.

Herein, display device 100C may be an example of the display device. Second converter 136C may be an example of the second converter.

In display device 100C described in the fourth exemplary embodiment, for example, converter 130C that includes calculator 134C and second converter 136C decreases the knee point as the maximum luminance increases or as the white area increases. Display device 100C configured above and described in this exemplary embodiment can control narrowing of gradations in a high luminance portion of a lighted image.

Fifth Exemplary Embodiment

A fifth exemplary embodiment will be described below with reference to FIGS. 17 to 20. In this exemplary embodiment, a modification of the second exemplary embodiment will be described.

[5-1. Configuration]

Figure 17:
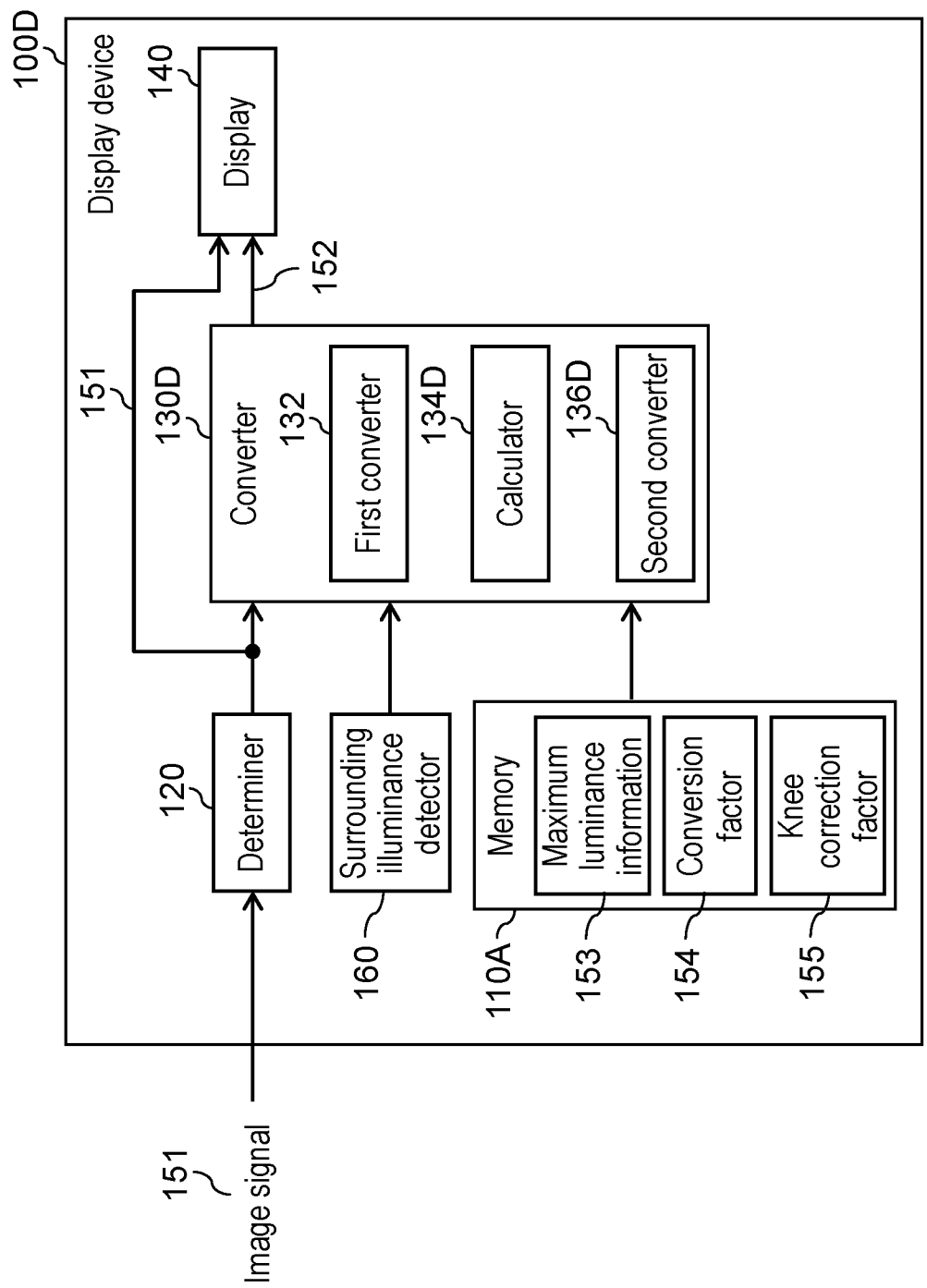
FIG. 17 is a block diagram schematically illustrating an example of a configuration of a display device in a fifth exemplary embodiment.

FIG. 17 is a block diagram schematically illustrating an example of a configuration of display device 100D in the fifth exemplary embodiment.

The configuration of display device 100D in the fifth exemplary embodiment is substantially the same as the configuration of display device 100A described in the second exemplary embodiment with reference to FIG. 6 and thus will not be described in detail. As illustrated in FIG. 17, however, display device 100D in the fifth exemplary embodiment includes surrounding illuminance detector 160 in addition to the configuration of display device 100A illustrated in FIG. 6.

Surrounding illuminance detector 160, which may be an illuminance sensor, for example, senses luminance around display device 100D as surrounding illuminance.

[5-2. Operation]

[5-2-1. Operation of Display Device 100D]

A description will be given below of an operation of display device 100D configured above in the fifth exemplary embodiment, with reference to FIG. 18.

Figure 18:
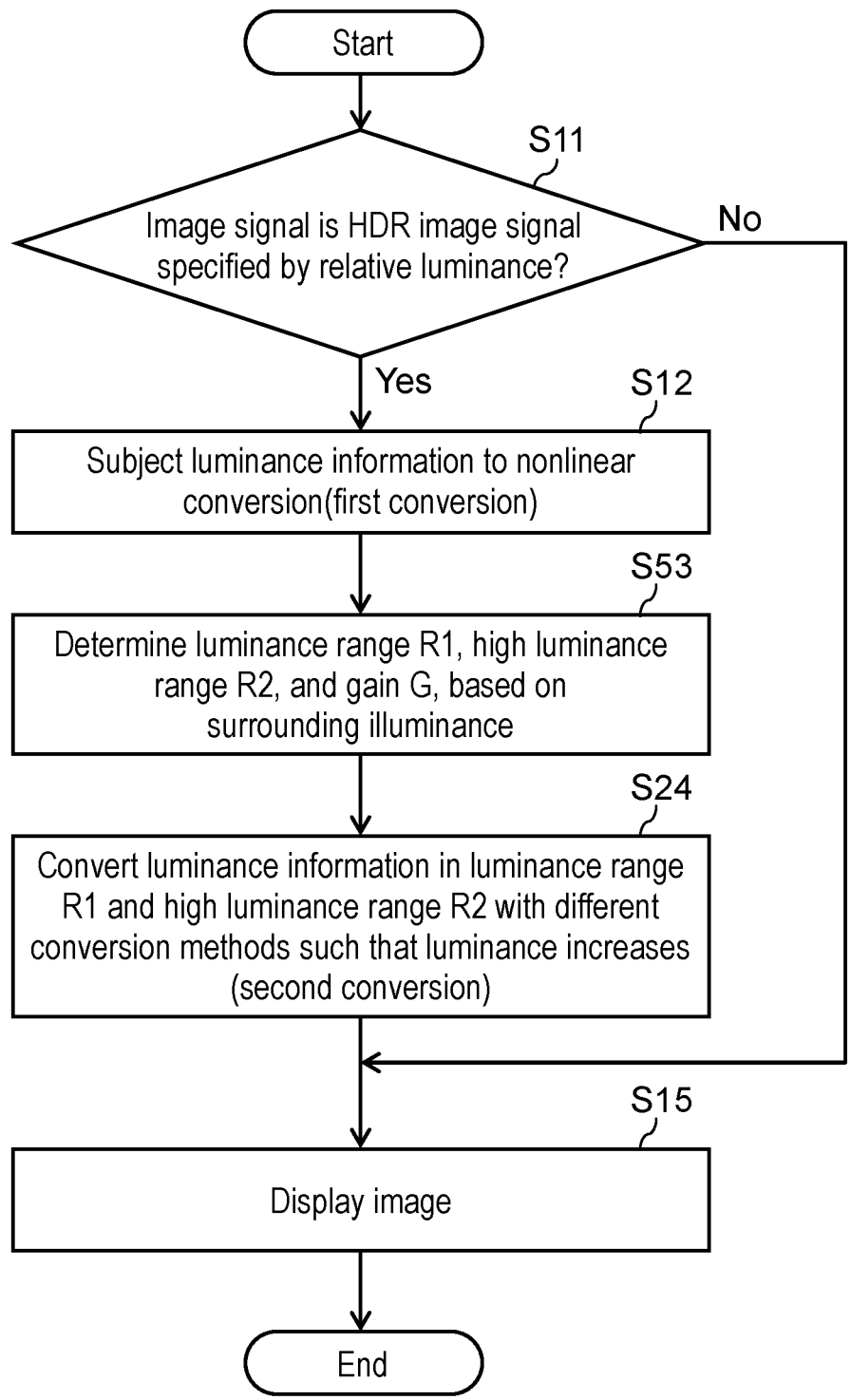
FIG. 18 is a flowchart of an example of an operation of the display device in the fifth exemplary embodiment.

FIG. 18 is a flowchart of an example of the operation of display device 100D in the fifth exemplary embodiment. In FIG. 18, operations that are substantially the same as the operations at the steps in the flowchart of FIG. 7 are given identical step numbers and will not be described.

The flowchart of FIG. 18 has step S53, instead of step S23 illustrated in the flowchart of FIG. 7.

In the case of YES at step S11, calculator 134D in converter 130D determines luminance range R1, high luminance range R2, and gain G in a manner similar to the manner in the second exemplary embodiment (step S53). In this case, calculator 134D in converter 130D adjusts gain G for dark part luminance to medium luminance, in accordance with the surrounding illuminance, details of which will be described later.

[5-2-2. Adjustment of Dark Part Luminance to Medium Luminance]

A method of adjusting dark part luminance to medium luminance will be described with reference to FIGS. 19 and 20.

Figure 19:
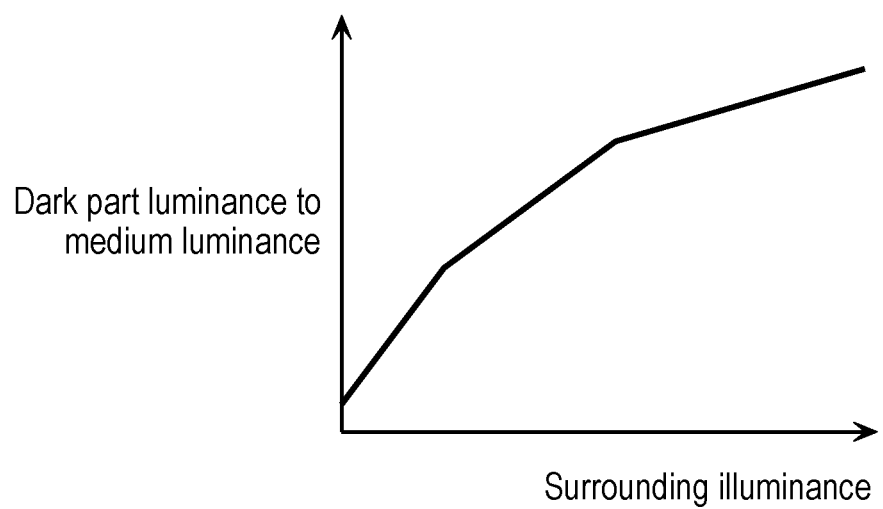
FIG. 19 is a schematic diagram illustrating an example of a relationship between surrounding illuminance and dark part luminance to medium luminance in the fifth exemplary embodiment.

FIG. 19 is a schematic diagram illustrating an example of a relationship between surrounding illuminance and dark part luminance to medium luminance in the fifth exemplary embodiment.

In display device 100D in the fifth exemplary embodiment, converter 130D adjusts luminance in such a way that the dark part luminance to medium luminance increases as the surrounding illuminance increases. It should be noted that the relationship illustrated in FIG. 19 is an example and is not intended to limit the present disclosure at all. For example, display device 100D may adjust luminance in such a way that the dark part luminance to medium luminance linearly increases as the surrounding illuminance increases.

Figure 20:
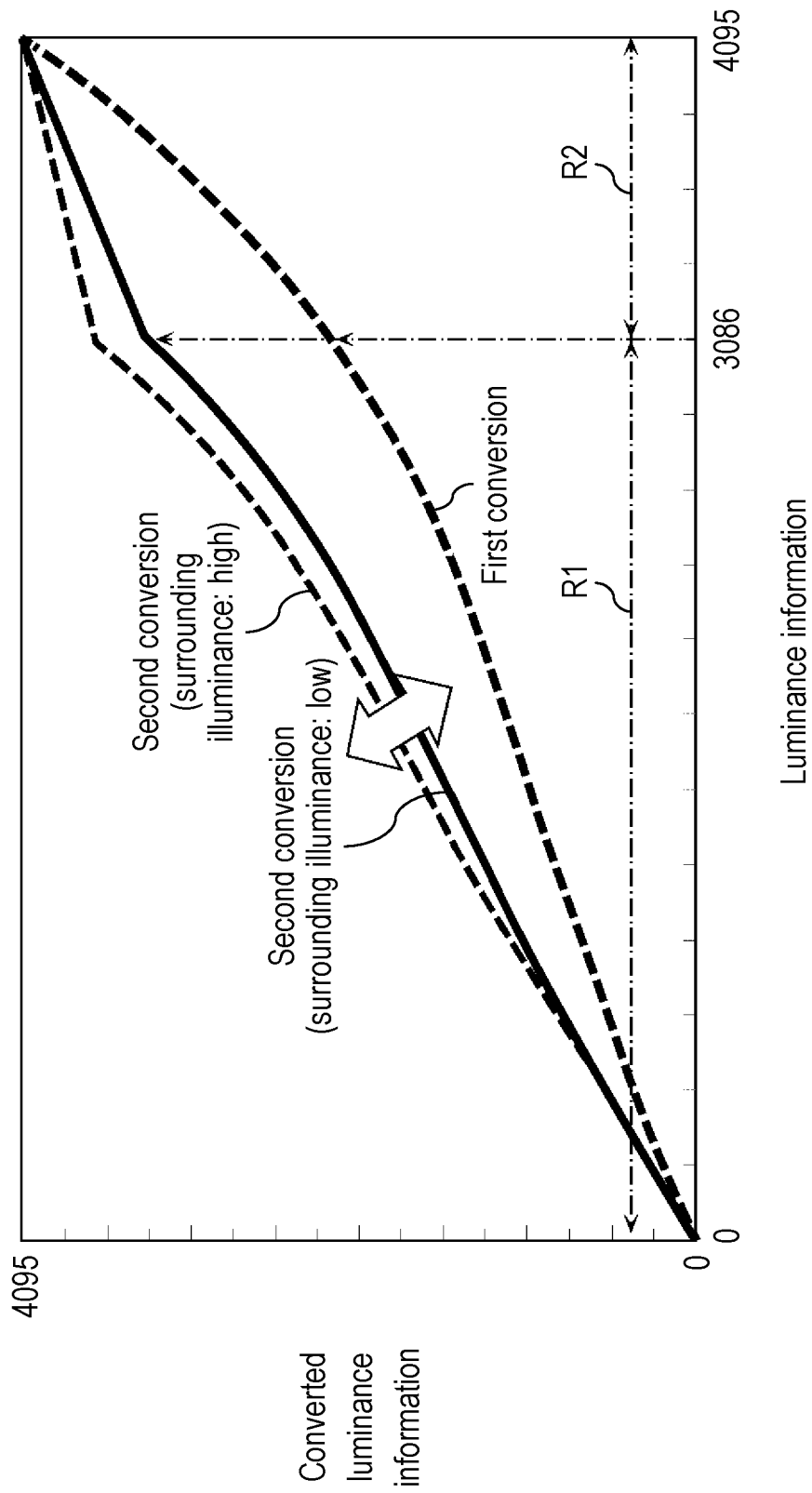
FIG. 20 is an explanatory diagram illustrating an example of second conversion of luminance information in the fifth exemplary embodiment.

FIG. 20 is an explanatory diagram illustrating an example of second conversion of the luminance information in the fifth exemplary embodiment.

Converter 130D increases gain G in accordance with the surrounding illuminance, for example, as illustrated in FIG. 19, thereby increasing the dark part luminance to medium luminance as illustrated in FIG. 20.

In this case, in addition to simply increasing gain G, converter 130D may decrease a knee point (decrease a knee correction factor) with the increase in gain G. FIG. 20 illustrates an exemplary operation of increasing luminance in entire luminance range R1; however, this exemplary operation is not intended to limit the present disclosure. For example, converter 130D may increase luminance of only a partial region of luminance range R1 in which luminance corresponding to the dark part luminance to medium luminance is lowered.

The above operation may be repeated, for example, at intervals of several seconds. If the control in the fifth exemplary embodiment is performed in combination with the control in fourth exemplary embodiment, display device 100D may perform the above control for every frame, similar to the fourth exemplary embodiment.

[5-3. Effects and Others]

In a display device in this exemplary embodiment, as described above, a second converter may convert luminance information that has been subjected to nonlinear conversion by a first converter such that a display will display an image at further increased luminance in at least a partial region contained in a luminance range as surrounding illuminance increases.

Herein, display device 100D may be an example of the display device. Second converter 136D may be an example of the second converter.

For example, in display device 100D described in the fifth exemplary embodiment, converter 130D that includes second converter 136D may increase the dark part luminance to medium luminance with an increase in the surrounding illuminance. In short, converter 130D that includes second converter 136D converts the luminance information that has been subjected to the nonlinear conversion by first converter 132 such that display 140 will display an image at further increased luminance in at least a partial range contained in luminance range R1 as the surrounding illuminance increases. In this way, display device 100D helps a user to recognize an image at dark part luminance to medium luminance in a lighted environment.

Other Exemplary Embodiments

The first to fifth exemplary embodiments have been described above as examples of the technique disclosed in the present application. However, the technique in the present disclosure is not limited to those exemplary embodiments and is also applicable to exemplary embodiments that have undergone changes, replacements, additions, or omissions, for example. In addition, novel exemplary embodiments can be conceived of by combining some of the constituent elements described in the first to fifth exemplary embodiments.

Other exemplary embodiments will be described below.

Display devices 100 to 100D in the above exemplary embodiments do not necessarily have to be provided with calculators 134 to 134D. In this case, for example, first converter 132 may calculate luminance range R (or luminance range R1 and high luminance range R2) and gain G.

Each of memories 110 and 110A does not necessarily have to store conversion factor 154. In this case, each of converters 130 to 130D does not have to read conversion factor 154, and each of calculators 134 to 134D may handle maximum luminance information (500 nits) that display 140 can display, as relative luminance (500%) and may calculate luminance range R (or luminance range R1 and high luminance range R2) and gain G.

In display devices 100 to 100D described in the foregoing exemplary embodiments, individual blocks of memories 110, 110A, determiner 120, first converter 132, calculators 134 to 134D, and second converters 136 to 136D may be implemented by circuits. In which case, each block may be implemented using a single chip formed by a semiconductor device such as a large scale integration (LSI). Some or all of the blocks may be integrated into a single chip.

Some or all of processes performed by individual functional blocks in the foregoing exemplary embodiments may be implemented by computer programs. The individual processes in the foregoing exemplary embodiments may be implemented in hardware or software (operating system (OS) or middleware). The software may be implemented together with a predetermined library. Alternatively, the processes may be implemented by processes performed by the combination of software and hardware.

Sequences of the processing methods that have been described with reference to the flowcharts in the foregoing exemplary embodiments do not necessarily have to be limited to the sequences described in the exemplary embodiments. Those sequences may be changed without departing from the spirit of the present disclosure.

The signal processing methods performed by display devices 100 to 100D described above, computer programs that cause a computer to perform these signal processing methods, and computer readable recording media in which these programs are recorded fall within the scope of the present disclosure. Examples of such computer readable recording media include flexible disks, hard disks, CD-ROMs, MOs, DVDs, DVD-ROMs, DVD-RAMs, Blu-ray (registered trademark) discs (BDs), and semiconductor memories. Such computer programs are not limited to computer programs recorded in the above recording media and may be transmitted over, for example, an electrical communication line, a wireless or wired communication line, or a network represented by the Internet.

The components described in the accompanying drawings and the detailed description include not only the components essential for solving the problem but also components that are not essential for solving the problem in order to illustrate the above-described technique. For this reason, even if these unessential components are described in the accompanying drawings and the detailed descriptions, these unessential components should not be immediately approved as being essential.

The above exemplary embodiments are provided to exemplify the technique according to the present disclosure. Therefore, it is possible to make various changes, replacements, additions, omissions, and the like within the scope of the claims and equivalents thereof.

INDUSTRIAL APPLICABILITY

The present disclosure is applicable to display devices that display an image based on an HDR image signal specified by relative luminance. More specifically, the present disclosure is applicable to television sets, for example.

REFERENCE MARKS IN THE DRAWINGS 100, 100A, 100B, 100C, 100D: display device
110, 110A: memory
120: determiner
130, 130A, 130B, 130C, 130D: converter
132: first converter
134, 134A, 134B, 134C, 134D: calculator
136, 136A, 136C, 136D: second converter
140: display
151, 152: image signal
153: maximum luminance information
154: conversion factor
155: knee correction factor
160: surrounding illuminance detector

The invention claimed is:

1. A display device having a display that displays an image based on a received image signal, the display device comprising:
a memory that stores maximum luminance information regarding maximum luminance that the display can display;
a determiner that determines whether the image signal is a high dynamic range (HDR) image signal specified by relative luminance;
a first converter that, when the determiner determines that the image signal is the HDR image signal specified by the relative luminance, subjects luminance information of the image signal to a nonlinear first conversion based on a luminance characteristic of the display within an entire luminance range of the image signal; and
a second converter that subjects the luminance information that has been subjected to the nonlinear first conversion by the first converter to a second conversion such that the display displays an image at increased luminance, which is higher than luminance before the second conversion, within a luminance range determined from the maximum luminance information regarding the maximum luminance that the display can display.

2. The display device according to claim 1, wherein the second converter converts the luminance information that has been subjected to the nonlinear first conversion by the first converter such that the display displays an image at increased luminance within the luminance range and within a high luminance range, luminance being higher in the high luminance range than in the luminance range, different conversion methods being used for the luminance range and the high luminance range.

3. The display device according to claim 2, wherein the second converter converts the luminance information that has been subjected to the nonlinear first conversion by the first converter, by multiplying the luminance information in the luminance range by a gain more than 1 and such that the luminance information before the nonlinear first conversion and the luminance information after the nonlinear first conversion have a linear relationship within the high luminance range.

4. The display device according to claim 3, wherein the luminance range is a luminance range determined from the maximum luminance information corrected using information received from a user.

5. The display device according to claim 3, wherein the second converter sets a maximum value in the luminance range to a lower value as maximum luminance used in the image signal has a larger value.

6. The display device according to claim 3, wherein the second converter decreases a maximum value in the luminance range as a white area in the image signal increases.

7. The display device according to claim 2, wherein the luminance range is a luminance range determined from the maximum luminance information corrected using information received from a user.

8. The display device according to claim 2, wherein the second converter sets a maximum value in the luminance range to a lower value as maximum luminance used in the image signal has a larger value.

9. The display device according to claim 2, wherein the second converter decreases a maximum value in the luminance range as a white area in the image signal increases.

10. The display device according to claim 1, wherein the second converter sets a maximum value in the luminance range to a higher value as average luminance obtained from the image signal has a larger value.

11. The display device according to claim 1, wherein the second converter converts the luminance information that has been subjected to the nonlinear first conversion by the first converter such that the display displays an image at further increased luminance within at least a partial range contained in the luminance range as surrounding illuminance increases.

12. A signal processing method performed by a display device having a display that displays an image based on a received image signal, the signal processing method comprising:
   determining whether the image signal is a high dynamic range (HDR) image signal specified by relative luminance;
   when the determination is made that the image signal is the HDR image signal specified by the relative luminance, subjecting luminance information of the image signal to a nonlinear first conversion based on a luminance characteristic of the display within an entire luminance range of the image signal; and
   performing a second conversion comprising converting the luminance information that has been subjected to the nonlinear first conversion such that the display displays an image at increased luminance, which is higher than luminance before the second conversion, within a luminance range determined from maximum luminance information regarding maximum luminance that the display can display.

* * * * *